United States Patent [19]

Kurita

[11] Patent Number: 4,491,519
[45] Date of Patent: Jan. 1, 1985

[54] FILTER CLOTH ARRANGEMENT FOR USE IN FIXED FILTER CLOTH TYPE FILTER PRESS

[75] Inventor: Tetsuya Kurita, Takarazuka, Japan

[73] Assignee: Kurita Machinery Manufacturing Company Limited, Osaka, Japan

[21] Appl. No.: 552,241

[22] Filed: Nov. 16, 1983

[30] Foreign Application Priority Data

Nov. 19, 1982 [JP] Japan .............................. 57-204343
Nov. 19, 1982 [JP] Japan .............................. 57-204344
Nov. 19, 1982 [JP] Japan .............................. 57-204345

[51] Int. Cl.$^3$ ............................................ B01D 25/12
[52] U.S. Cl. ................................... 210/225; 210/228
[58] Field of Search ....................... 210/225, 228, 227

[56] References Cited

U.S. PATENT DOCUMENTS

| | | | |
|---|---|---|---|
| 2,932,399 | 4/1960 | Emele | 210/225 |
| 3,360,130 | 12/1967 | Kaga | 210/225 |
| 3,366,244 | 1/1968 | Kurita | 210/225 |
| 3,390,772 | 7/1968 | Juhasz | 210/225 X |
| 3,503,326 | 3/1970 | Juhasz et al. | 210/225 X |
| 3,622,005 | 11/1971 | Kurita | 210/225 |
| 3,767,052 | 10/1973 | Shibasaki | 210/225 |
| 4,237,009 | 12/1980 | Kurita | 210/227 |
| 4,397,746 | 8/1983 | Kratochuil | 210/228 |
| 4,435,288 | 3/1984 | Miyano | 210/227 |

FOREIGN PATENT DOCUMENTS 0049892 6/1977 Japan ............................. 210/225
2088231A 6/1982 United Kingdom .

*Primary Examiner*—John Adee
*Attorney, Agent, or Firm*—Wenderoth, Lind & Ponack

[57] ABSTRACT

A filter cloth arrangement for use in a fixed filter cloth type filter press including at least one pair of first and second filter plates and a pair of first and second filter cloths interposed between the first and second filter plates. The arrangement includes a support member for supporting upper ends of the first and second filter cloths, an elastic member for vibratingly supporting the support member, a fixing member for fixing lower ends of the first and second filter cloths to it, and a first slurry feeding plate attached to the first filter cloth.

10 Claims, 47 Drawing Figures

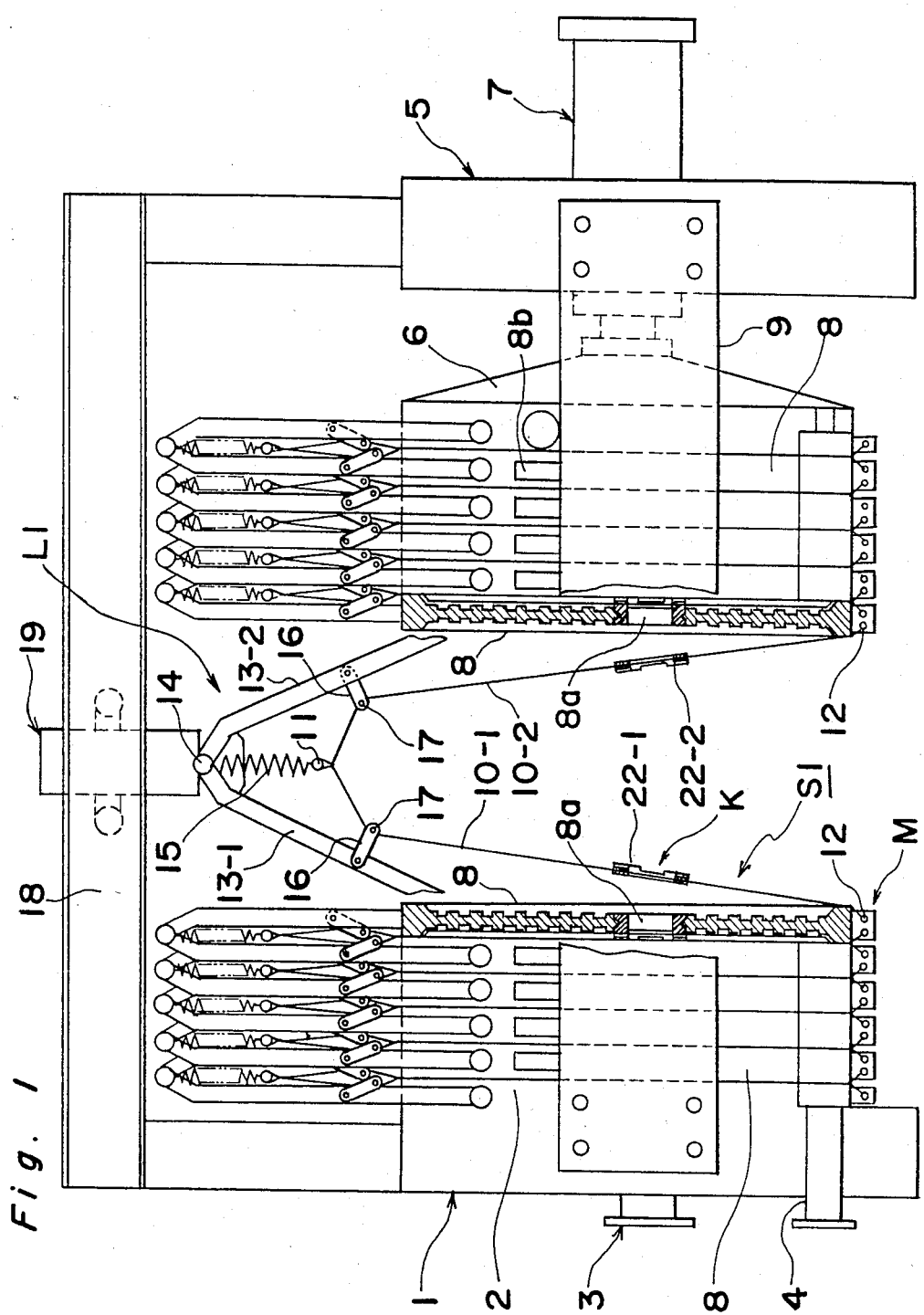

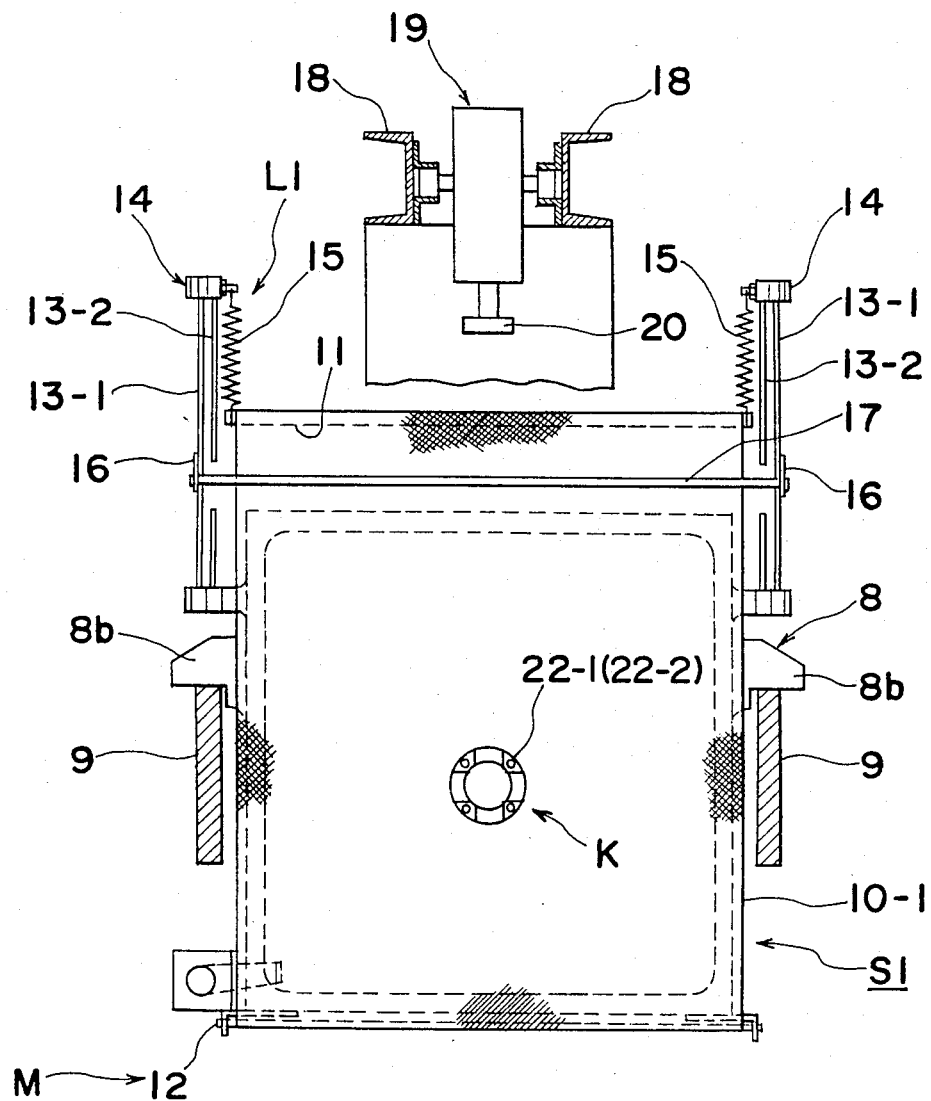

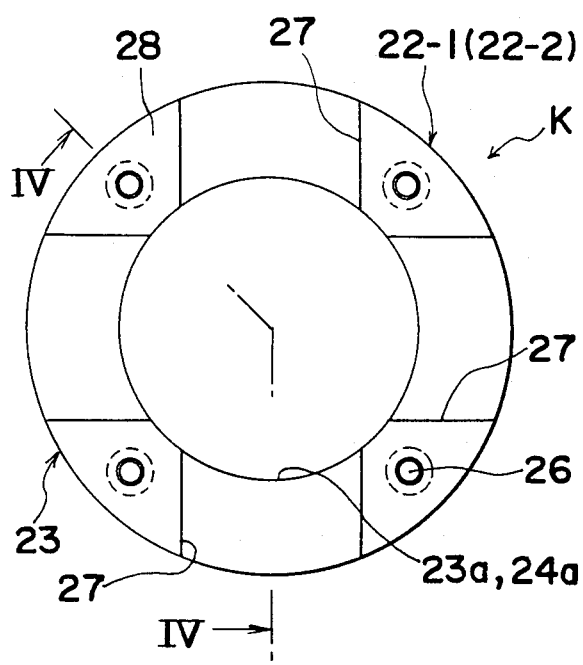
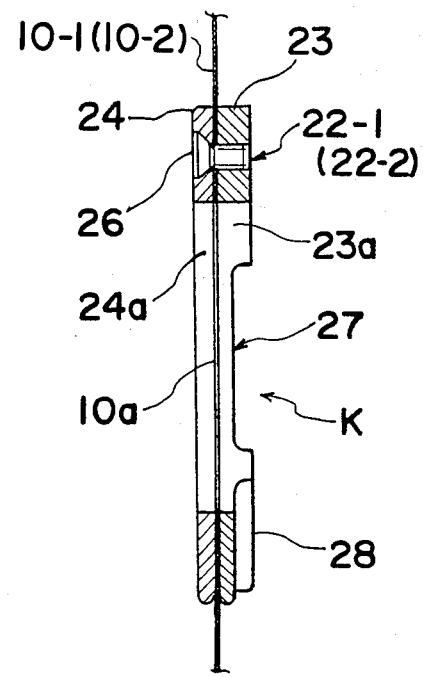
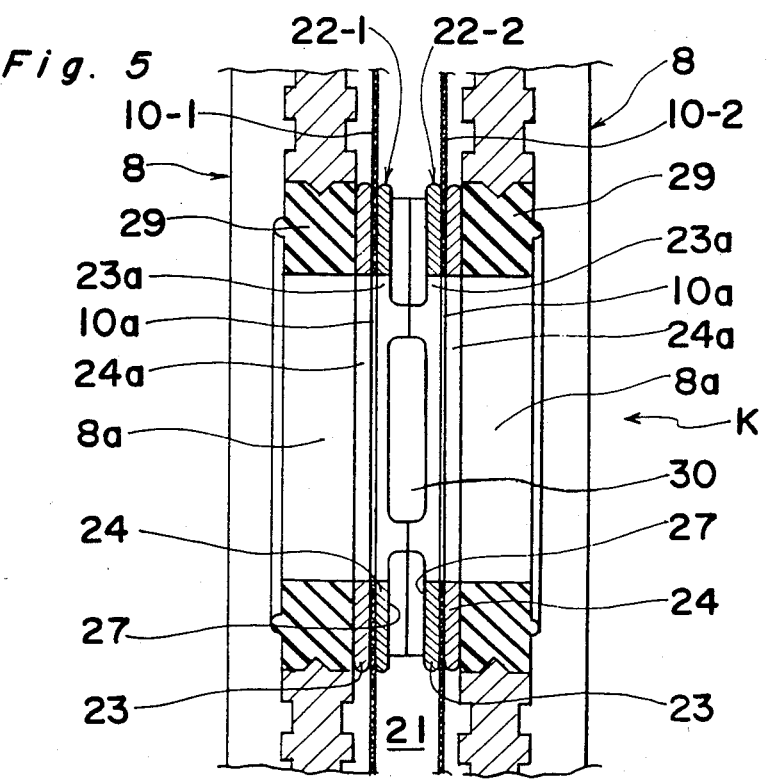

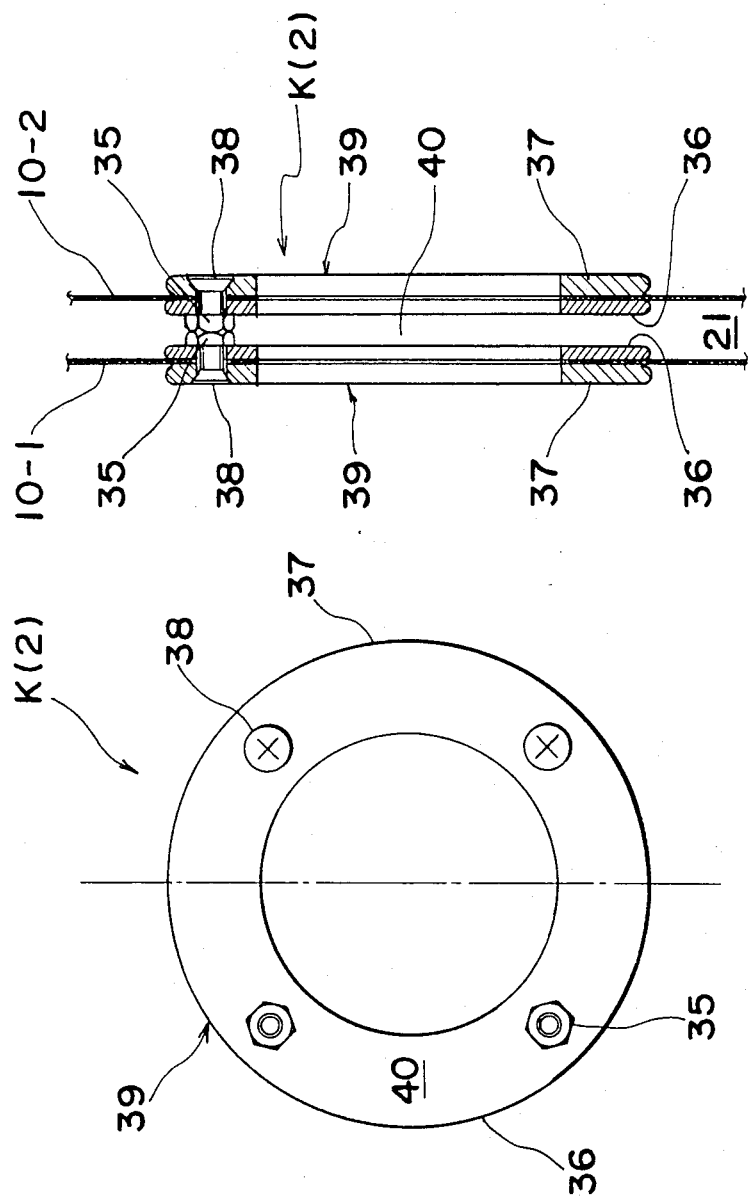

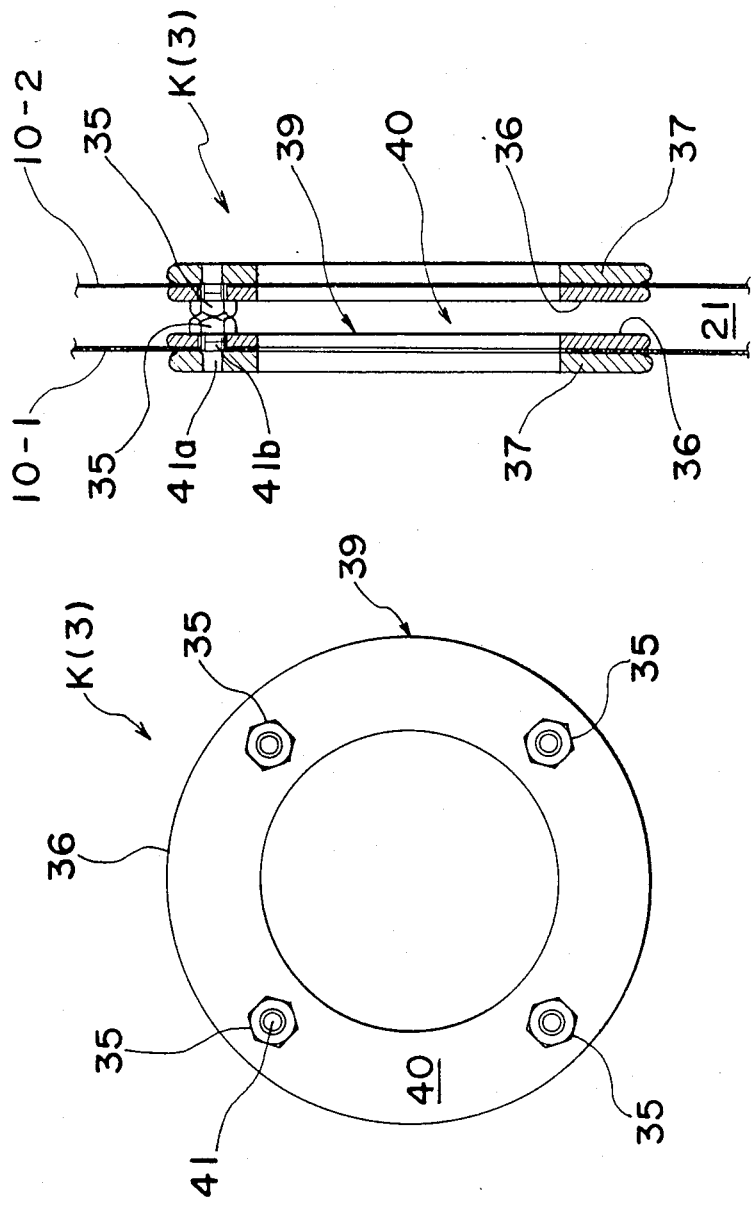

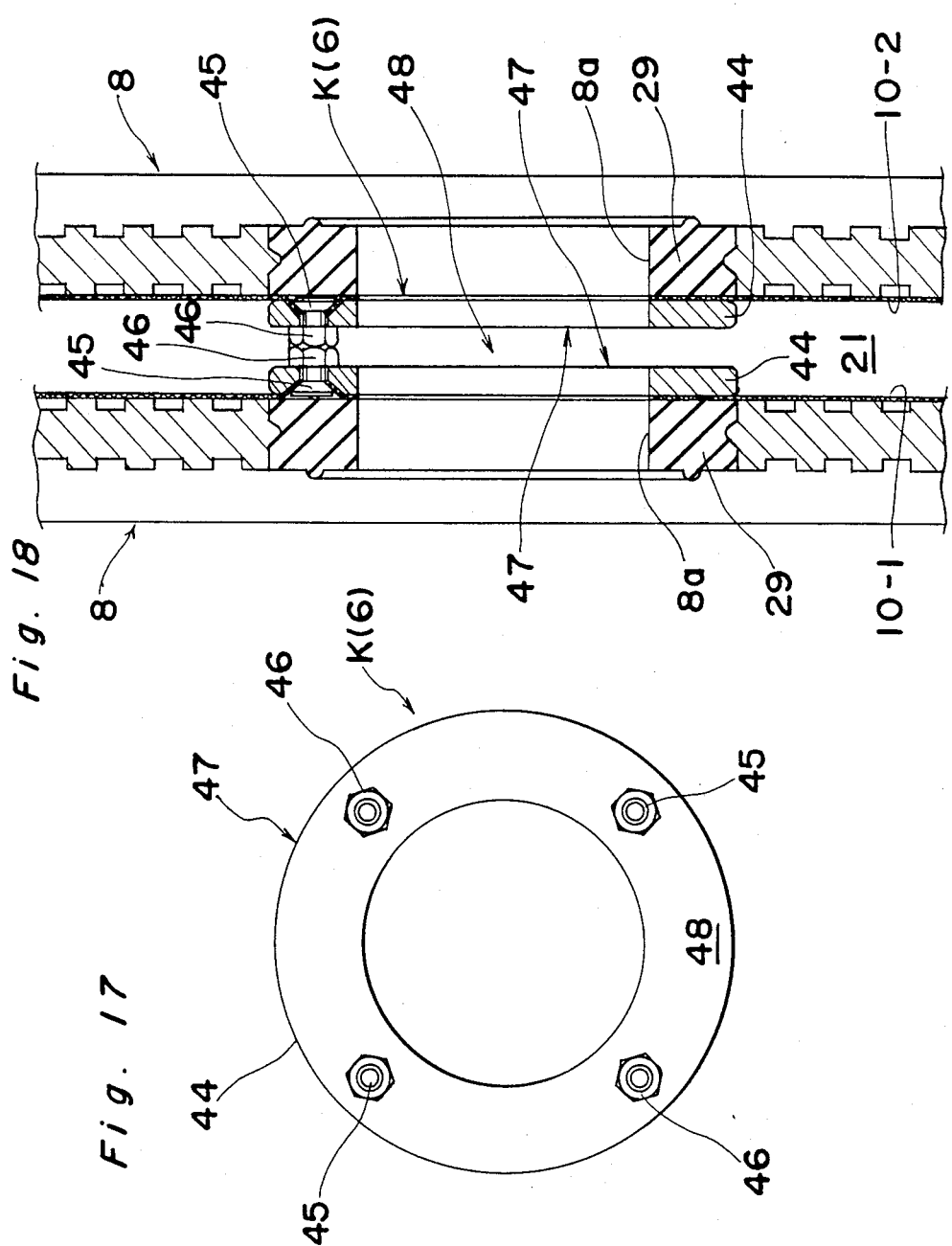

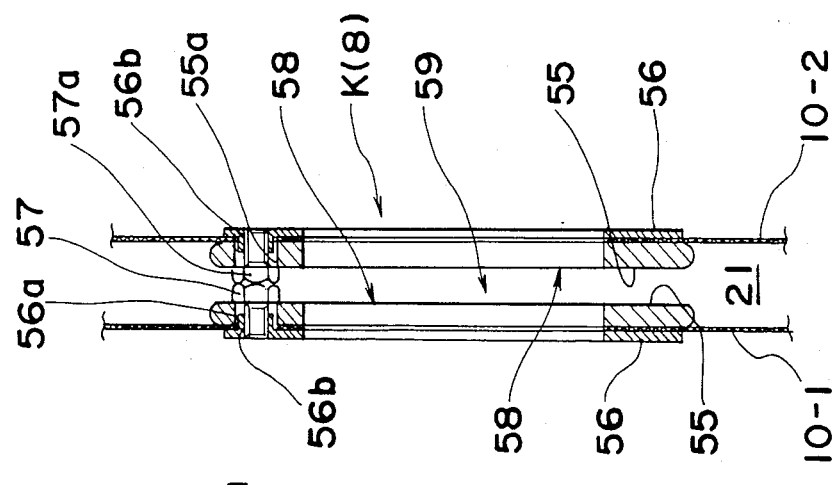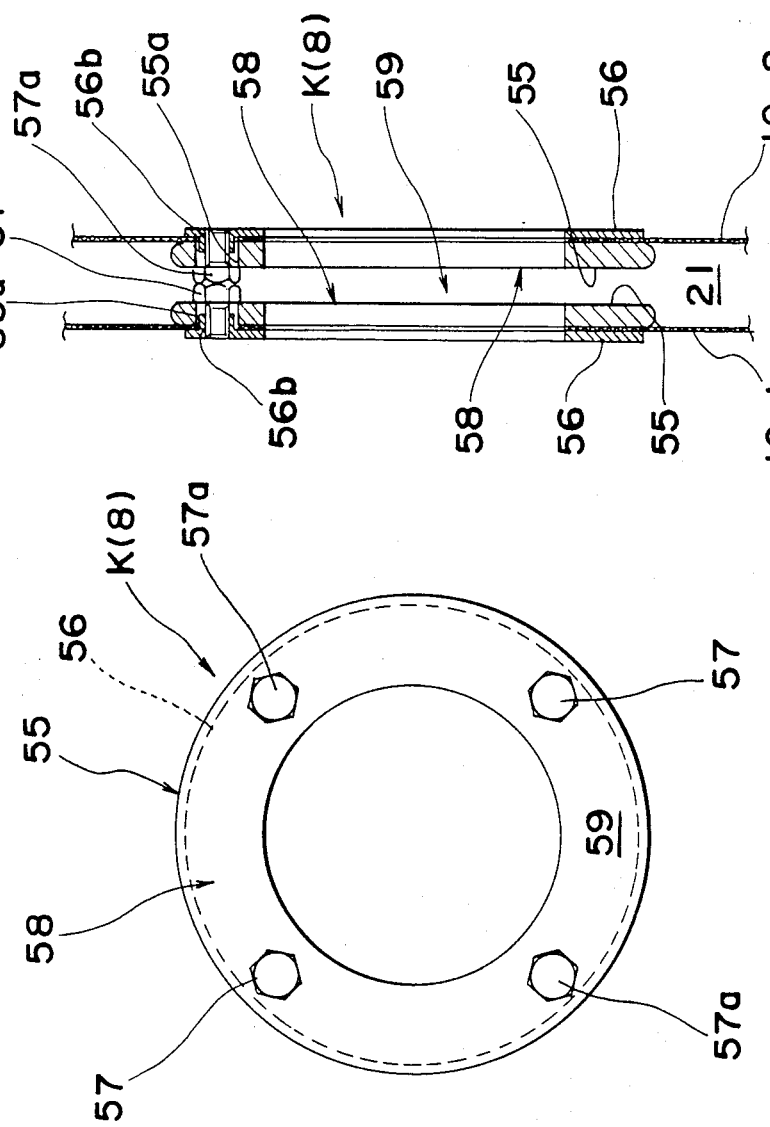

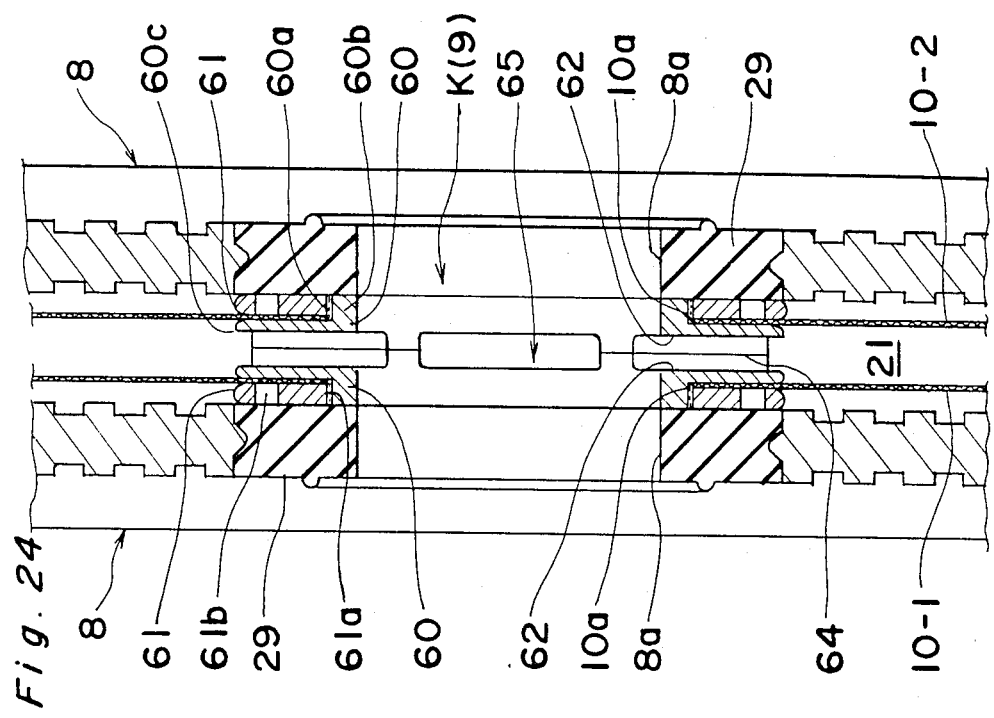
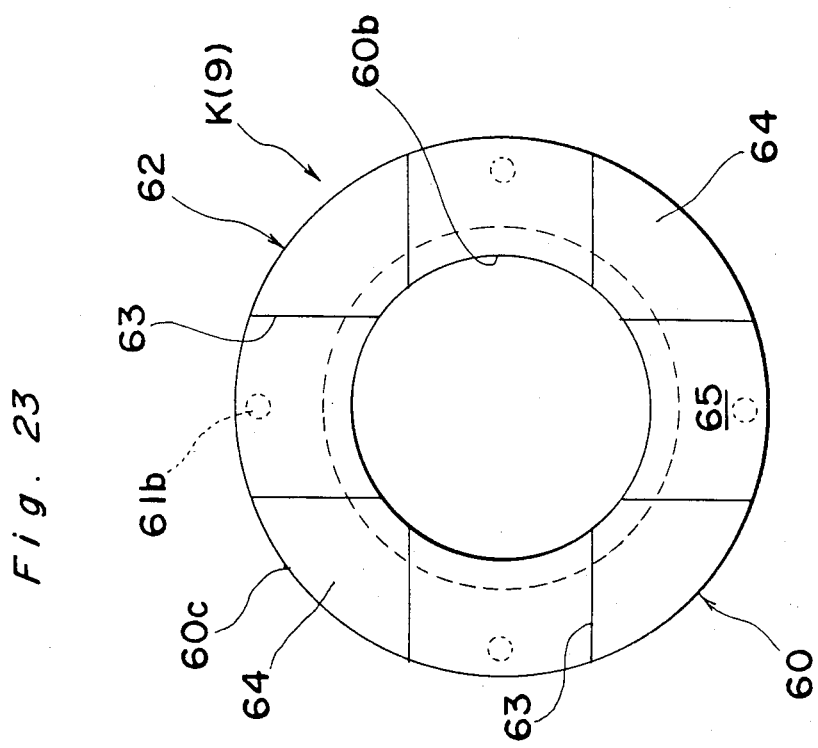

Fig. 27
Fig. 28
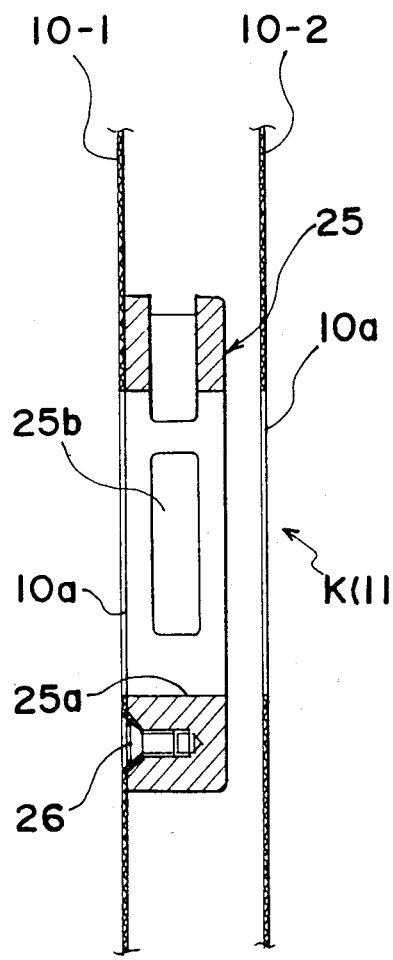
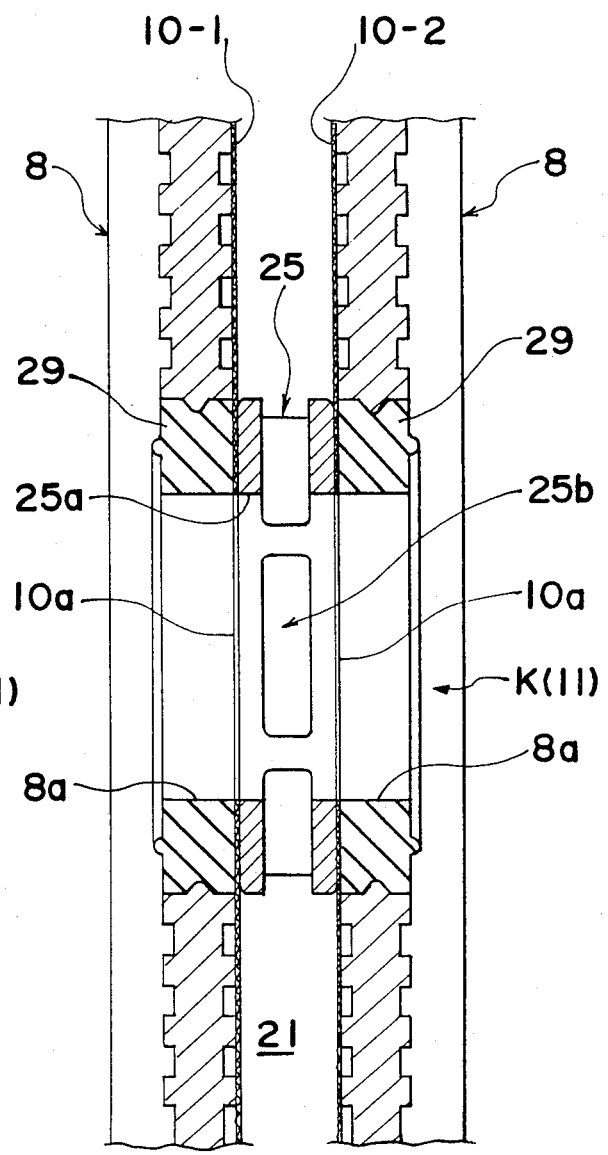

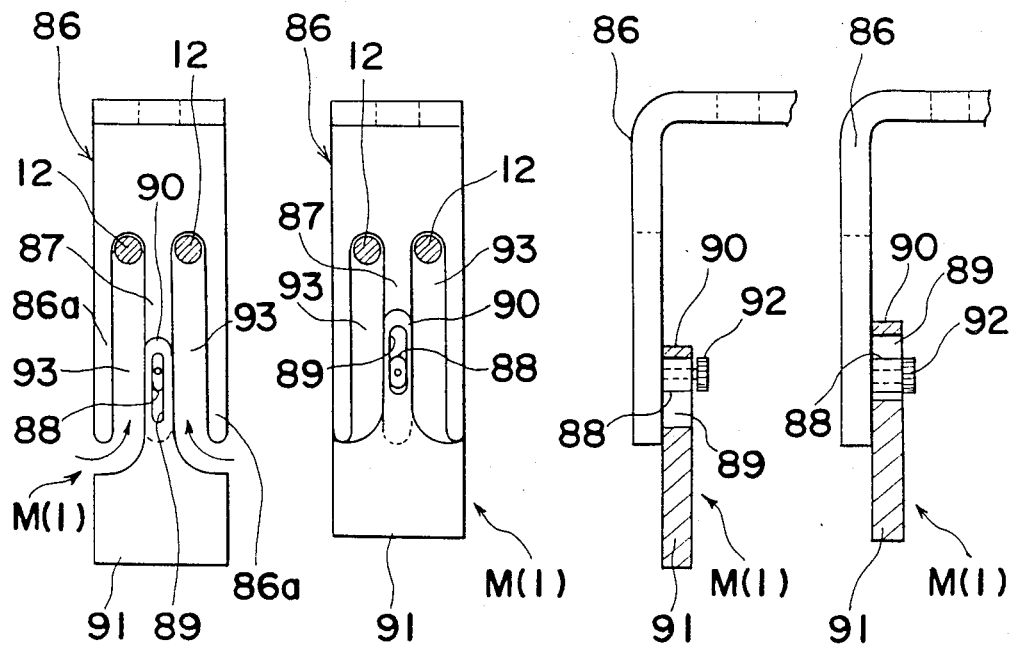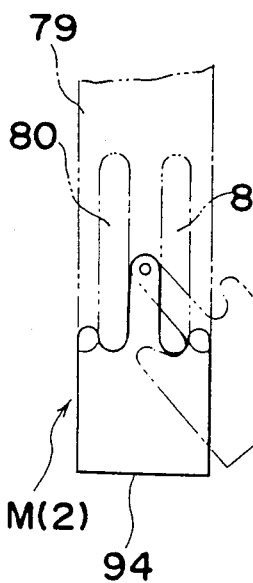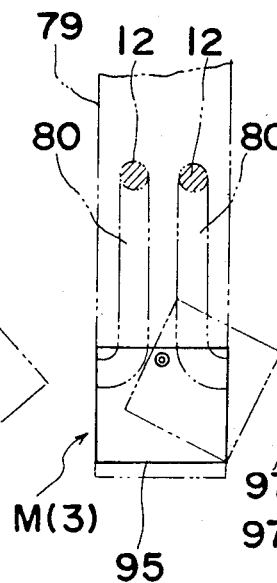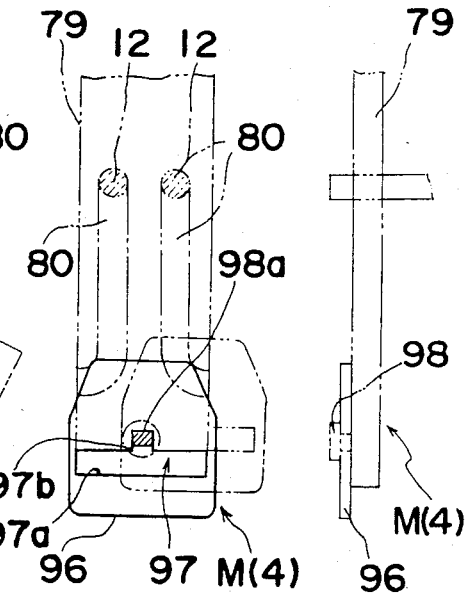

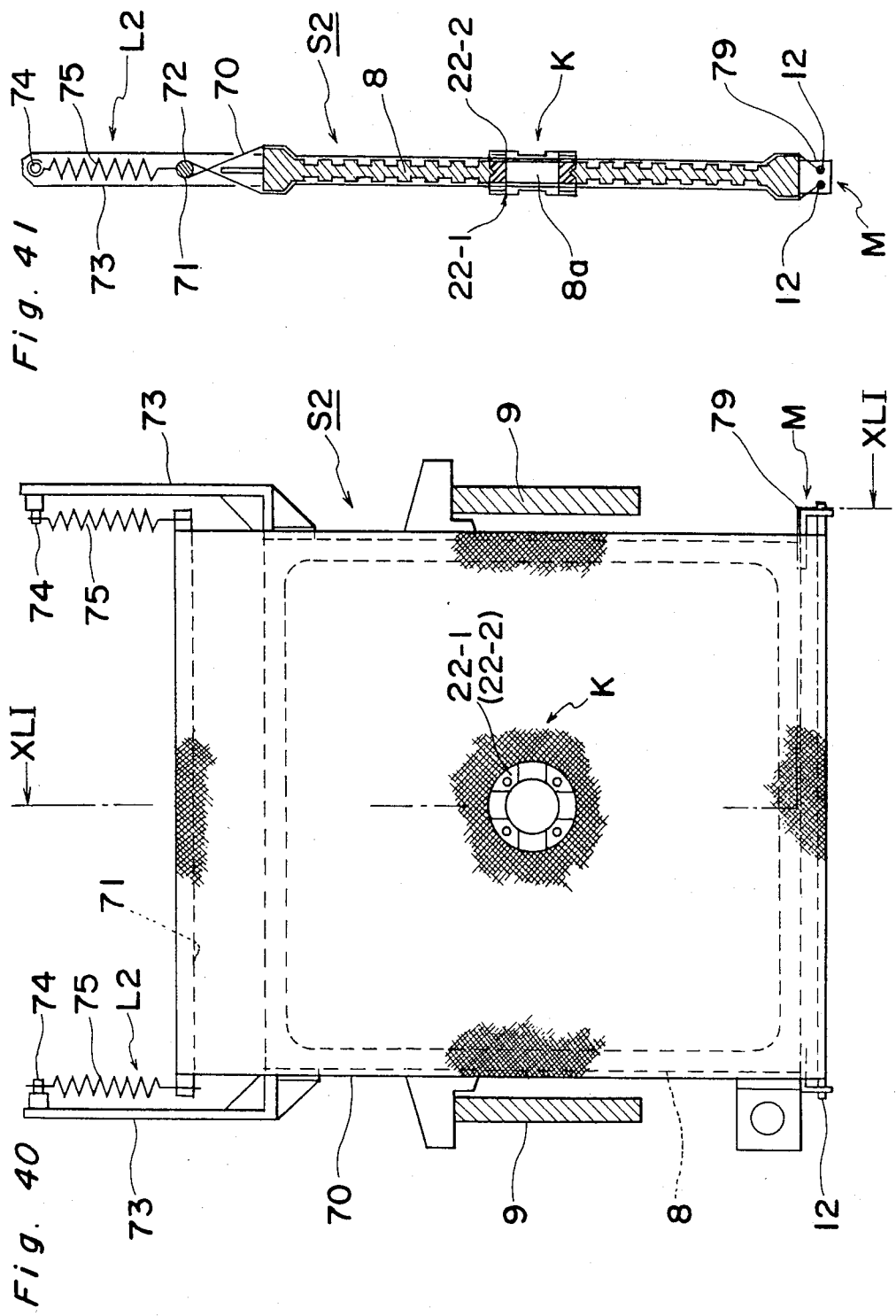

FILTER CLOTH ARRANGEMENT FOR USE IN FIXED FILTER CLOTH TYPE FILTER PRESS

The present invention generally relates to a fixed filter cloth type filter press including a plurality of filter plates and a plurality of filter cloths interposed in pairs between adjacent ones of the filter plates, in which upper ends of the filter cloths are hung for support above the filter plates and portions of the filter cloths are attached to the filter plates and more particularly, to a filter cloth arrangement for use in the fixed filter cloth type filter press.

Conventionally, there have been proposed various filter cloth fixing arrangements for use in fixed filter cloth type filter presses of this kind.

For example, Japanese Utility Model Publication No. 21094/1963 (Jikkosho 38-21094) discloses a filter cloth fixing arrangement in which each pair of adjacent filter cloths hung at opposite sides of a filter plate are coupled to each other in a slurry hole of the filter plate so as to form slurry feed openings of the filter cloths and are retained at the slurry hole.

Meanwhile, Japanese Patent Publication No. 20697/1964 (Tokkosho 39-20697) discloses a filter cloth fixing arrangement in which outer peripheral portions of slurry holes of filter cloths are clamped to outer peripheral portions of slurry holes of filter plates by the use of fixtures each formed with a slurry opening.

Furthermore, Japanese Utility Model Publication Nos. 20384/1970 (Jikkosho 45-20384) and 13027/1970 (Jikkosho) 45-13027) disclose filter cloth fixing arrangements in which, when filter plates are clamped to one another, each pair of fixtures of filter cloths are brought into contact with each other so as to form a slurry feed passage therebetween.

As described above, in the conventional filter cloth fixing arrangements, it has been so arranged that the filter cloths are attached to the outer peripheral portions of the slurry holes of the filter plates. Accordingly, in the known filter cloth fixing arrangements, even if upper ends of the filter cloths are elastically supported by support rods and the filter cloths are subjected to vibration by vibrating the support rods when the filter plates are retracted away from one another, vibration of the filter cloths is not transmitted to lower portions of the filter cloths, disposed downwardly of the slurry holes of the filter plates. Consequently, the known filter cloth fixing arrangements have such an inconvenience that, although viscous filter cakes remaining on the upper portions of the filter cloths are scraped off therefrom through vibration of the filter cloths so as to fall down therefrom for discharge thereof, a portion of viscous filter cakes adhering to the lower portions of the filter cloths falls down by its own weight, but the remaining portion of the viscous filter cakes is not scraped off therefrom so as to adhere thereto as filter residue due to a fact that the lower portions of the filter cloths are not vibrated, thereby aggravating the filtering efficiency.

Accordingly, an essential object of the present invention is to provide an improved filter cloth arrangement for use in a fixed filter cloth type filter press, provided with a filter cloth supporting construction in which filter residue can be efficiently removed from overall portions of filter cloths when filter plates are retracted away from one another, with substantial elimination of the disadvantages inherent in conventional filter cloth arrangements of this kind.

Another important object of the present invention is to provide an improved filter cloth arrangement of the above described type provided with a slurry feeding device by which the filter cloths can be easily attached to the filter plates and slurry to be filtered is fed between the filter cloths such that vibration of the filter cloths is not restricted at all by other components than the filter cloths.

Still another object of the present invention is to provide an improved filter cloth arrangement of the above described type which is simple in structure, highly reliable in actual use, suitable for mass production at low cost, and can be readily incorporated into fixed filter cloth type filter presses and the like at low cost.

In accomplishing these and other objects according to one preferred embodiment of the present invention, there is provided an improved filter cloth arrangement for use in a fixed filter cloth type filter press including at least one pair of first and second filter plates formed with first and second slurry feed openings, respectively and a pair of first and second filter cloths interposed between said first and second filter plates, said first and second filter cloths being, respectively, formed with first and second slurry holes in communication with said first and second slurry feed openings and defining a filter chamber therebetween when said first and second filter plates are clamped to each other, said filter cloth arrangment comprising: a support member for supporting upper ends of said first and second filter cloths; an elastic member for vibratingly supporting said support member; a fixing member for fixing lower ends of said first and second filter cloths to lower portions of said first and second filter plates, respectively; and a first filter cloth so as to be disposed between said first and second filter cloths such that said first filter cloth is vibrated together with said first slurry feeding plate when said first and second filter plates are retracted away from each other; said first slurry feeding plate, when said first and second filter plates are clamped to each other, defining a slurry feed passage for introducing, in communication with said first and second slurry holes, into said filter chamber, slurry to be filtered such that the slurry is fed from either one of said first and second slurry feed openings into said filter chamber through corresponding either one of said first and second slurry holes and said slurry feed passage.

In accordance with the present invention, since each of the filter cloths retained at the lower ends can be vibrated as a whole by vibrating the support members for supporting the upper ends of the filter cloths when the filter plates are retracted away from each other, while the slurry feeding plates are vibrated together with the filter plates so as not to restrict vibration of the filter cloths, the filter cakes are completely removed from the filter cloths through overall vibration of the filter cloths and therefore, can be smoothly discharged therefrom.

It is to be noted here that the term "filter plate" means a so-called pressing filter plate in addition to an ordinary filter plate, hereinbelow. Thus, the filter cloth arrangement of the present invention can also be applied to a filter press having ordinary filter plates and pressing filter plates arranged alternately or a filter press provided with only pressing filter plates.

Meanwhile, it should be further noted that the term "fixed filter cloth type" is used in contrast with a term "filter cloth travelling type" and means a type in which effective filtration areas of the filter cloths are not caused to travel with respect to the filter plates in upward and downward directions and are allowed to vibrate but are substantially fixed to the filter plates.

These and other objects and features of the present invention will become apparent from the following description taken in conjunction with the preferred embodiment thereof with reference to the accompanying drawings, in which:

FIG. 1 is a side elevational view, partly in section, of a fixed filter cloth type filter press in which a filter cloth arrangement according to a first embodiment of the present invention is incorporated;

FIG. 2 is a front elevational view of the filter press of FIG. 1;

FIG. 3 is a front elevational view of a slurry feeding device employed in the filter cloth arrangement of FIG. 1;

FIG. 4 is a cross-sectional view taken along the line IV—IV in FIG. 3;

FIG. 5 is a cross-sectional view of the slurry feeding device of FIG. 3 interposed between a pair of filter plates employed in the filter press of FIG. 1;

FIGS. 8 and 9 are views similar to FIGS. 3 and 5, respectively, particularly showing a second modification thereof;

FIGS. 10 and 11 are views similar to FIGS. 3 and 5, respectively, particularly showing a third modification thereof;

FIGS. 17 and 18 are views similar to FIGS. 3 and 5, respectively, particularly showing a sixth modification thereof;

FIGS. 21 and 22 are views similar to FIGS. 3 and 5, respectively, particularly showing an eighth modification thereof;

FIGS. 23 and 24 are views similar to FIGS. 3 and 5, respectively, particularly showing a ninth modification thereof;

FIGS. 26, 27 and 28 are views similar to FIGS. 3, 4 and 5, respectively, particularly showing an eleventh modification thereof;

Figure 32:
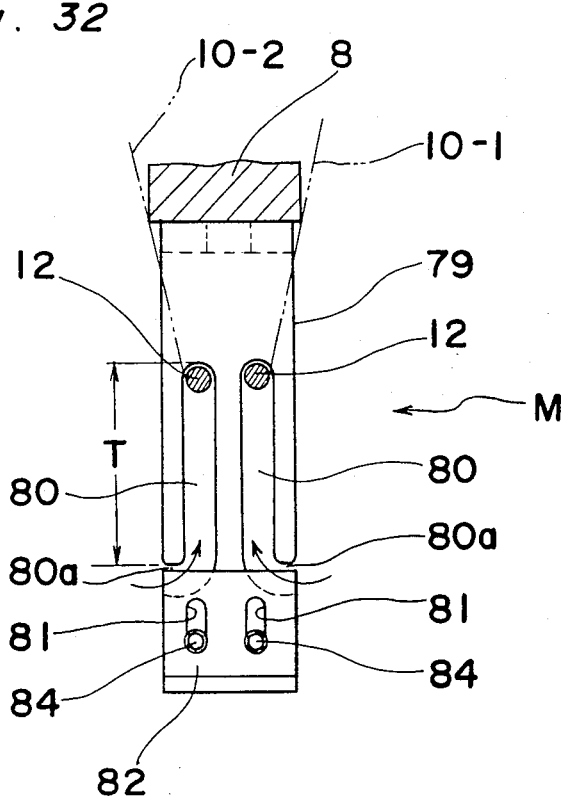
FIG. 32 is a front elevational view of a filter cloth retaining device employed in the filter cloth arrangement of FIG. 1.
Figure 33:
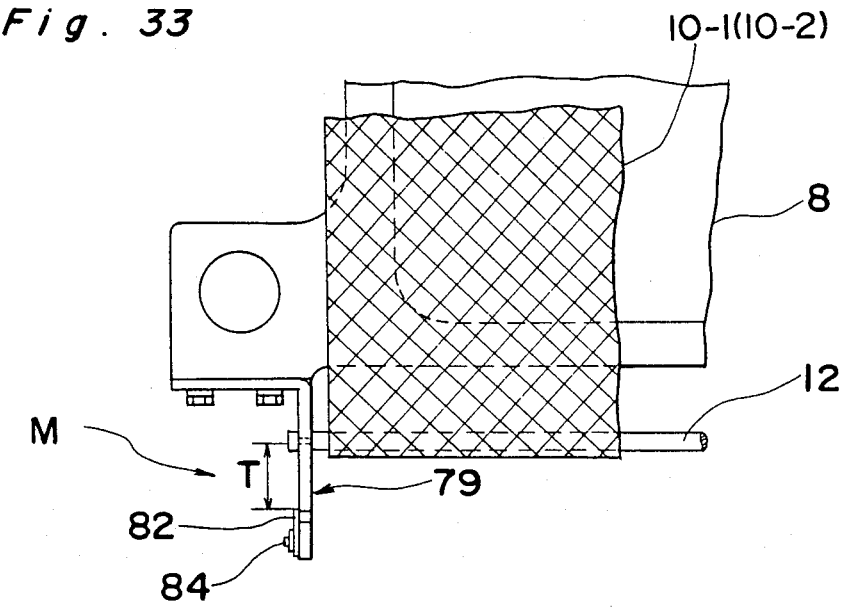
FIG. 33 is a side elevational view of the filter cloth retaining device of FIG. 32.
Figure 39:
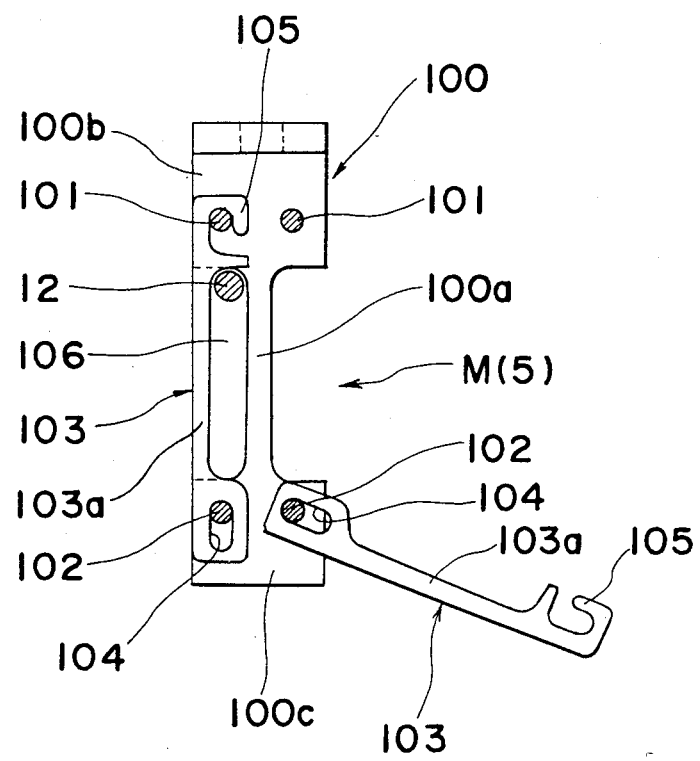
Figure 42:
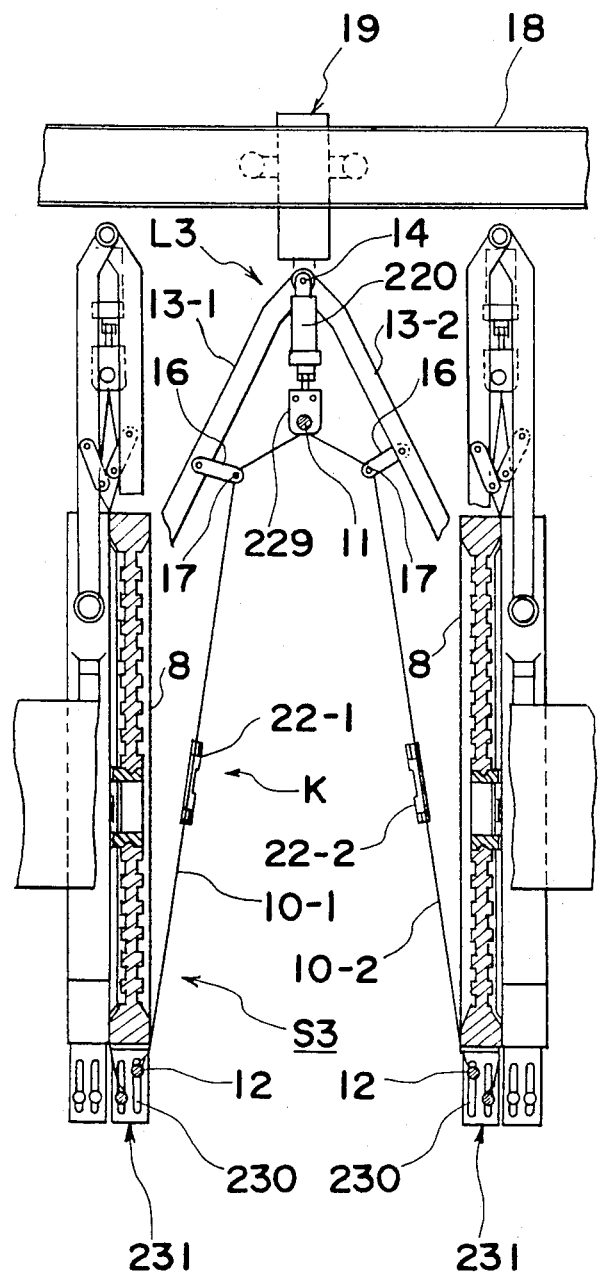
Figure 43:
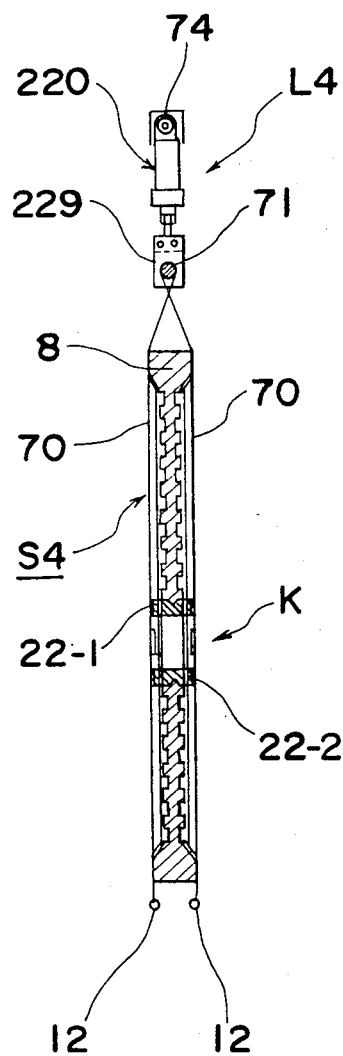
Figure 44:
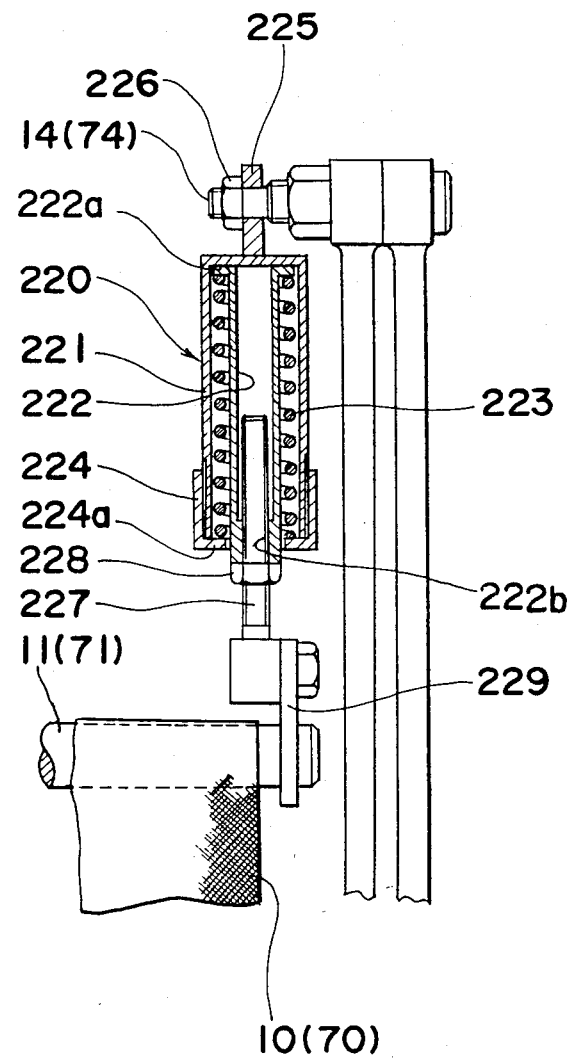

FIGS. 34(a) and 34(b) and FIGS. 35(a) and 35(b) are views similar to FIGS. 32 and 33, respectively, particularly showing a first modification thereof;

FIGS. 36 and 37 are views similar to FIG. 32, particularly showing second and third modification thereof, respectively;

FIGS. 38(a) and 38(b) are views similar to FIGS. 32 and 33, respectively, particularly showing a fourth modification thereof;

FIG. 39 is a view similar to FIG. 32, particularly showing a fifth modification thereof;

FIG. 40 is a view similar to FIG. 2, particularly showing a filter cloth arrangement according to a second embodiment of the present invention;

FIG. 41 is a cross-sectional view taken along the line XLI—XLI in FIG. 40;

FIG. 42 and 43 are views similar to FIG. 1, particularly showing filter cloth arrangements according to third and fourth embodiments of the present invention, respectively; and FIG. 44 is a cross-sectional view of an amplitude regulating device employed in the filter cloth arrangements of FIGS. 42 and 43.

Before the description of the present invention proceeds, it is to be noted that like parts are designated by like reference numerals throughout several views of the accompanying drawings.

Referring now to the drawings, there is shown in FIGS. 1 and 2, a fixed filter cloth type filter press in which a filter cloth arrangement S1 according to a first embodiment of the present invention is incorporated. The filter press generally includes a front stand 1, a main plate 2 supported by the front stand 1, a slurry feed pipe 3, a filtrate discharge pipe 4, a rear stand 5, a movable plate 6, a plurality of filter plates 8 each formed with a slurry feed opening 8a and a pair of lugs 8b, a hydraulic cylinder 7 for clamping the filter plates 8, a pair of side beams 9 extending between the front stand 1 and the rear stand 5 along opposite sides thereof, a plurality of filter cloths 10-1 and 10-2 interposed in pairs between adjacent ones of the filter plates 8 and each formed with a slurry hole 10a, and a pair of upper rails 18 extending between and mounted on upper portions of the front stand 1 and the rear stand 5. It should be noted here that leftward and rightward directions in FIG. 1 illustrate front and rear portions of the filter press, respectively. The slurry feed pipe 3 and the filtrate discharge pipe 4 are mounted on the front stand 1, while the hydraulic cylinder 7 having a plunger end coupled to a central portion of a rear face of the movable plate 6 is supported by the rear stand 5. Meanwhile, the pair of the lugs 8b disposed at opposite sides of each of the filter plates 8 are, respectively, placed on the pair of the side beams 9, so that the filter plates 9 can be moved in forward and rearward directions of the filter press. When the filter plates 8 are clamped to one another between the main plate 2 and the movable plate 6 upon forward displacement of the movable plate 6 by the use of the hydraulic cylinder 7, a filter chamber 21 (FIG. 5) is defined between each pair of the filter cloths 10-1 and 10-2 interposed in pairs between adjacent ones of the filter plates 8, so that slurry to be filtered which is fed under pressure into the filter chamber 21 is filtered such that filter residue caught in the filter chamber 21 is gradually formed into a filter cake, while filtrate is collected into the filtrate discharge pipe 4.

When one cycle of filtration has been completed, the movable plate 6 is retracted away from the main plate 2 and thus, the filter plates 8 are retracted away from each other sequentially from the side of the movable plate 6 by a known mechanism (not shown) such that the filter cakes are discharged from the filter chambers 21.

As shown in FIGS. 1 and 2, the filter cloth arrangement S1 generally includes a slurry feeding device K, a filter cloth supporting device L1 for supporting upper ends of each pair of the filter cloths 10-1 and 10-2 and a filter cloth retaining device M for retaining lower ends of each pair of the filter cloths 10-1 and 10-2 at lower portions of the adjacent filter plates 8.

The filter cloth supporting device L1 includes a support rod 11 for supporting the upper ends of each pair of the filter cloths 10-1 and 10-2 hanging therefrom, a pair of hinge pins 14, and a pair of coiled springs 15 having upper ends secured to the hinge pins 14, respectively and lower ends attached to opposite ends of the support rod 11, respectively for elastically supporting the support rod 11. Each of the hinge pins 14 is arranged to couple openable upper ends of a pair of links 13-1 and 13-2 to each other between and upwardly of the adjacent filter plates 8. Each of the links 13-1 and 13-2 has a link 16 hinged at a lower portion thereof and further, a tension bar 17 for straining each of the filter cloths 10-1 and 10-2 is secured to one end of the link 16. When the adjacent filter plates 8 are retracted away from each other as shown in FIG. 1, the filter cloths 10-1 and 10-2 are pulled apart from each other by a pair of the tension bars 17 so as to strain the filter cloths 10-1 and 10-2 properly. Furthermore, when a filter cloth vibrator 19 travelling along the upper rails 18 is disposed immediately above the support rod 11 and is operated to apply impact forces to the support rod 11 through actuation of an impact piston 20, the support rod 11 is subjected to large upward and downward vibrations, so that the pair of the filter cloths 10-1 and 10-2 are slackened and strained alternately such that filter residue adhering to the filter cloths 10-1 and 10-2 without falling down therefrom by its own weight at the time of retraction of the adjacent filter plates 8 away from each other is scraped off therefrom so as to fall down therefrom.

The slurry feeding device K generally includes a pair of slurry feeding plates 22-1 and 22-2 for introducing the slurry into the filter chamber 21 through the slurry feed openings 8a of the adjacent filter plates 8. As shown in FIGS. 1 and 2, in order to vibrate the pair of the filter cloths 10-1 and 10-2 smoothly, the pair of the slurry feeding plates 22-1 and 22-2 are attached to only the filter cloths 10-1 and 10-2, respectively and are separated from the adjacent filter plates 8. Accordingly, when the pair of the filter cloths 10-1 and 10-2 are strained as described above, the pair of the slurry feeding plates 22-1 and 22-2 are spaced away from the adjacent filter plates 8 together with the pair of the filter cloths 10-1 and 10-2, respectively.

More specifically, as shown in FIGS. 3 to 5, each of the slurry feeding plates 22-1 and 22-2 includes an inner ring 23 formed with a through-hole 23a and an outer ring 24 provided with a through-opening 24a and formed smaller, in thickness, than the inner ring 23. The inner ring 23 and the outer ring 24 are secured to each other by a plurality of flush bolts 26 so as to interpose each of the filter cloths 10-1 and 10-2 therebetween such that the slurry hole 10a of each of the filter cloths 10-1 and 10-2 is communicated with the through-hole 23a and the through-opening 24a, with the inner rings 23 of the slurry feeding plates 22-1 and 22-2 confronting each other. The inner ring 23 has two grooves 27 formed, in communication with the through-hole 23a, on one face thereof remote from the outer ring 24 and extending at right angles to each other. The grooves 27 have a depth substantially equal to a half of a thickness of the inner rings 23 such that four ungrooved portions 28 constitute projections of each of the pair of the inner rings 23.

Accordingly, when the adjacent filter plates 8 are clamped to each other as shown in FIG. 5, the pair of the slurry feeding plates 22-1 and 22-2 are interposed between packings 29 of the adjacent filter plates 8 such that the ungrooved portions 28 of the inner rings 23 of the pair of the slurry feeding plates 22-1 and 22-2 are brought into contact with each other, with each of the packings 29 defining each of the slurry feed openings 8a. At this time, a slurry feed passage 30 is formed between the pair of the slurry feeding plates 22-1 and 22-2 by the grooves 27 of the pair of the inner rings 23. Accordingly, the slurry is fed from one of the slurry feed openings 8a of the adjacent filter plates 8 into the filter chamber 21 through a corresponding one of the through-openings 24a of the pair of the outer rings 24, a corresponding one of the slurry holes 10a of the pair of the filter cloths 10-1 and 10-2, a corresponding one of the through-holes 23a of the pair of the inner rings 23 and the slurry feed passage 30. Although the slurry feed passage 30 is defined between the pair of the inner rings 23 by forming the grooves 27 and the projecting ungrooved protions 28 on the pair of the inner rings 23 in the above described embodiment, the slurry feed passage can be defined in various ways as follows.

Figure 7:
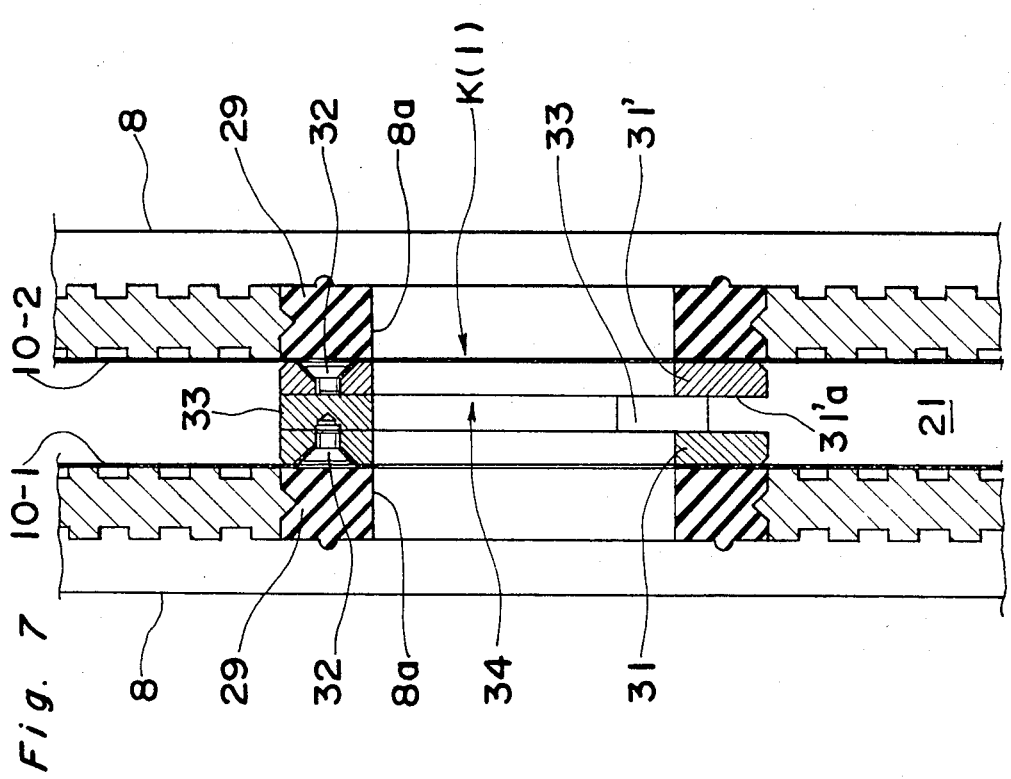
FIGS. 6 and 7 are views similar to FIGS. 3 and 5, respectively, particularly showing a first modification thereof.
Figure 6:
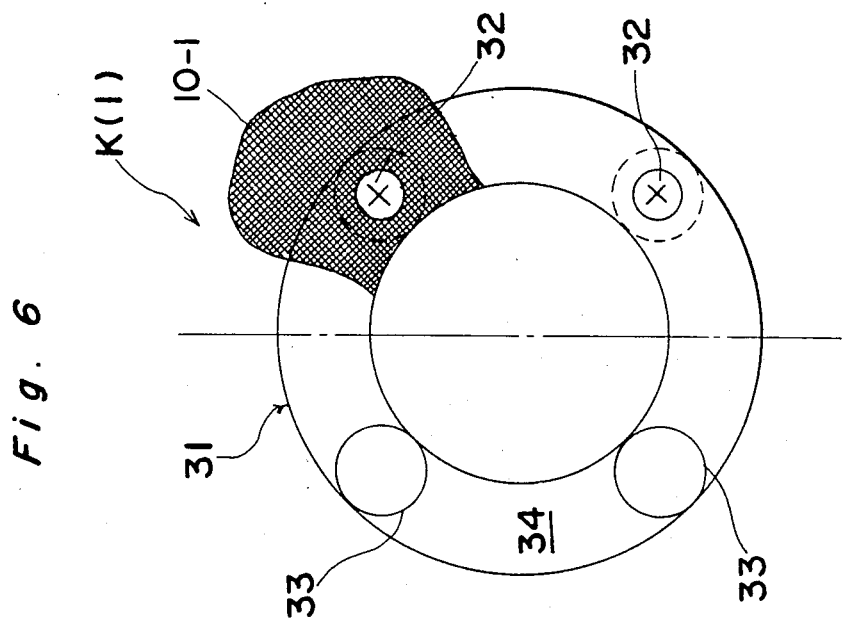

Referring to FIGS. 6 and 7, there is shown a slurry feeding device K(1) which is a first modification of the slurry feeding device K. The first modified slurry feeding device K(1) includes a pair of inner rings 31 and 31' each acting as a slurry feeding plate. The pair of the filter cloths 10-1 and 10-2 are, respectively, attached to the inner rings 31 and 31' by the use of a plurality of countersunk screws 32 so as to interpose the inner rings 31 and 31' therebetween. Meanwhile, the inner rings 31 has a plurality of cylindrical projections 33 formed on one face thereof remote from the filter cloth 10-1. Accordingly, when the adjacent filter plates 8 are clamped to each other, the projections 33 of the inner ring 31 are brought into contact with a mating face 31'a of the inner ring 31', whereby a slurry feed passage 34 is defined between the inner rings 31 and 31'.

Referring now to FIGS. 8 and 9, there is shown a slurry feeding device K(2) which is a second modification of the slurry feeding device K. The second modified slurry feeding device K(2) includes a pair of slurry feeding plates 39. Each of the slurry feeding plates 39 includes an inner ring 36 and an outer ring 37. By inserting a plurality of flush bolts 38 from the outer ring 37 into the inner ring 36 through each of the pair of the filter cloths 10-1 and 10-2 and then, fastening nuts 35 to the flush bolts 38, respectively, the inner ring 36 and the outer ring 37 are secured to each other so as to interpose each of the filter cloths 10-1 and 10-2 therebetween. When the adjacent filter plates 8 are clamped to each other, the nuts 35 projecting out of the pair of the inner rings 36 and confronting each other are brought into contact with each other, whereby a slurry feed passage 40 is defined between the pair of the inner rings 36.

Referring to FIGS. 10 and 11, there is shown a slurry feeding device K(3) which is a third modification of the slurry feeding device K. In the third modified slurry feeding device K(3), a plurality of stepped bolts 41 are employed in place of the flush bolts 38 of the second modified slurry feeding device K(2). Each of the stepped bolts 41 includes a small diameter rod portion 41a having a length equal to a thickness of the outer ring 37 and a threaded portion 41b having a length substantially equal to a sum of a thickness of the inner ring 36 and that of each of the nuts 35 and formed larger, in diameter, than the small diameter rod portion 41a. The small diameter rod portion 41a is welded, at its distal end, to the outer ring 37 at one face of the outer ring 37 remote from each of the filter cloths 10-1 and 10-2 such that the threaded portion 41b projects out of the inner ring 36. Then, the nuts 35 are fastened to the threaded portions 41b of the stepped bolts 41 of the pair of the slurry feeding plates 39 so as to confront each other. Accordingly, when the adjacent filter plates 8 are clamped to each other, the nuts 35 projecting out of the pair of the inner rings 36 and confronting each other are brought into contact with each other, whereby the slurry feed passage 40 is defined between the pair of the inner rings 36.

Figure 13:
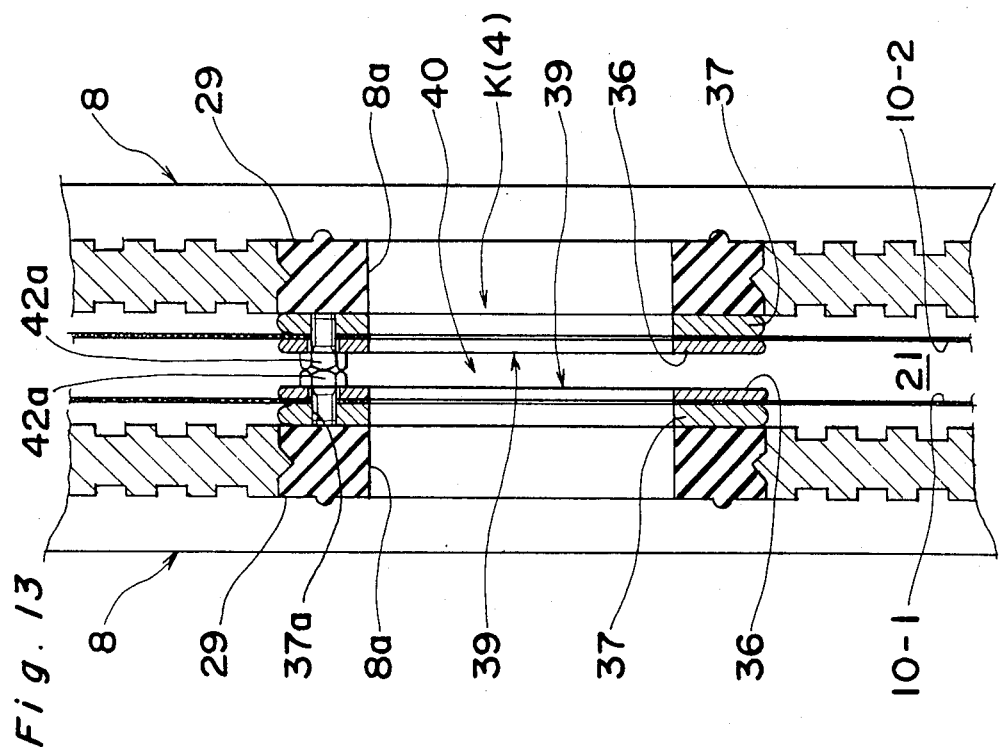
FIGS. 12 and 13 are views similar to FIGS. 3 and 5, respectively, particularly showing a fourth modification thereof.
Figure 12:
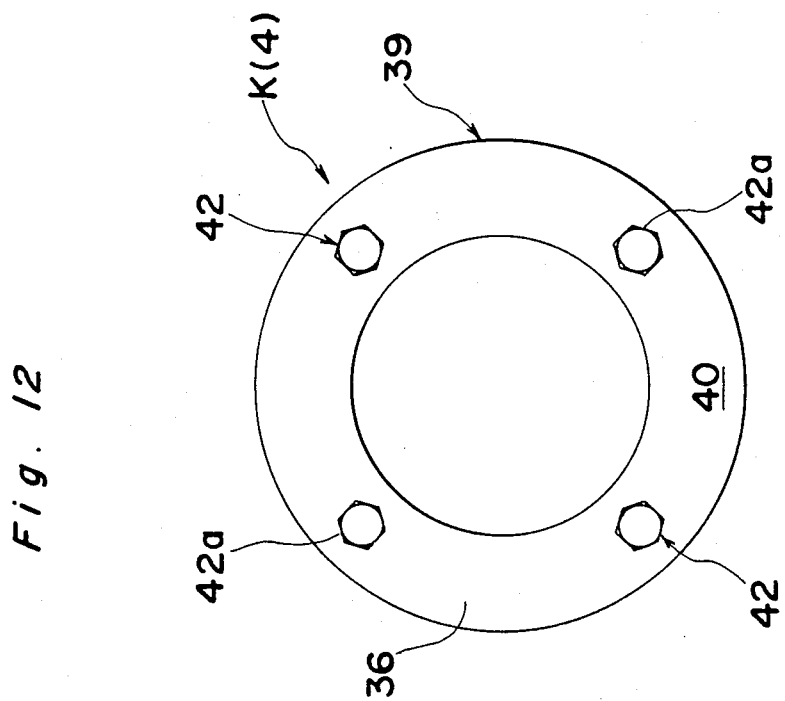

Referring to FIGS. 12 and 13, there is shown a slurry feeding device K(4) which is a fourth modification of the slurry feeding device K. In the fourth modified slurry feeding device K(4), a plurality of hexagon head bolts 42 each having a hexagon head 42a are employed in place of the nuts 35 and the flush bolts 38 of the second modified slurry feeding device K(2) and the nuts 35 and the stepped bolts 41 of the third modified slurry feeding device K(3). Namely, by screwing the hexagon head bolts 42 from the inner ring 36 into threaded holes 37a of the outer ring 37 through each of the filter cloths 10-1 and 10-2, the inner ring 36 and the outer ring 37 are secured to each other so as to interpose each of the filter cloths 10-1 and 10-2 therebetween such that the hexagon heads 42a projecting out of the pair of the inner rings 36 confront each other. Accordingly, when the adjacent filter plates 8 are clamped to each other, the hexagon heads 42a of the pair of the slurry feeding plates 39 are brought into contact with each other, whereby the slurry feed passage 40 is defined between the pair of the inner rings 36.

Figure 14:
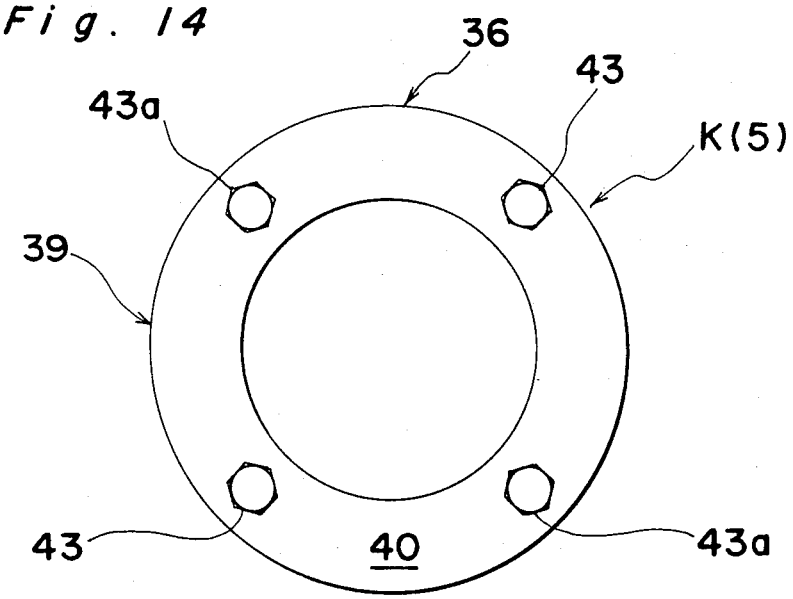
FIGS. 14 and 15 and FIG. 16 are views similar to FIGS. 3 and 5, respectively, particularly showing a fifth modification thereof.
Figure 15:
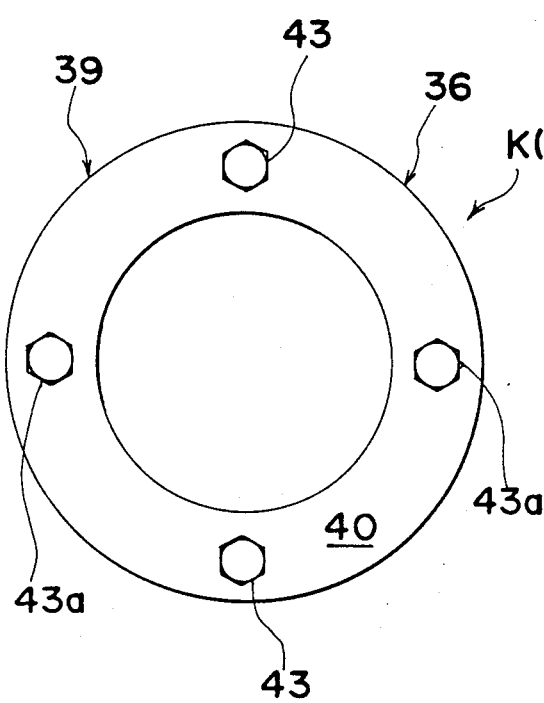
Figure 16:
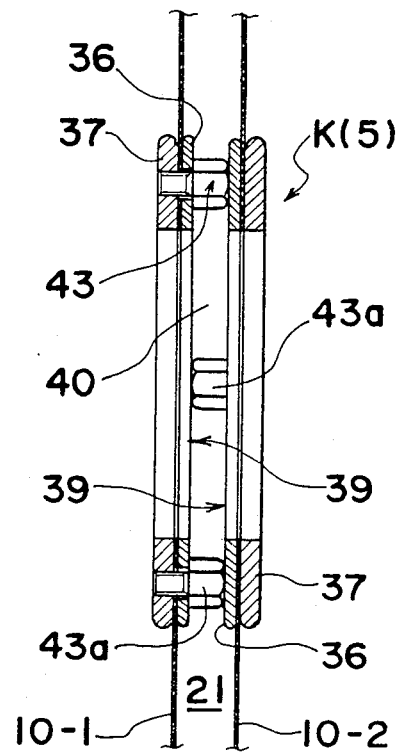

Referring to FIGS. 14 to 16, there is shown a slurry feeding device K(5) which is a fifth modification of the slurry feeding device K. In the fifth modified slurry feeding device K(5), a plurality of hexagon head bolts 43 each formed with a hexagon head 43a having a large height are employed in place of the hexagon head bolts 42 of the fourth modified slurry feeding device K(4). Furthermore, the hexagon head bolts 43 secured to one of the pair of the slurry feeding plates 39 are brought out of alignment with the hexagon head bolts 43 secured to the other one of the pair of the slurry feeding plates 39. Accordingly, when the adjacent filter plates 8 are clamped to each other, the hexagon heads 43a of the hexagon head bolts 43 secured to one and the other one of the pair of the slurry feeding plates 39 are, respectively, brought into contact with the inner rings 36 of the other one and the one of the pair of the slurry feeding plates 39, whereby the slurry feed passage 40 is defined between the pair of the inner rings 36.

Referring now to FIGS. 17 and 18, there is shown a slurry feeding device K(6) which is a sixth modification of the slurry feeding device K. The sixth modified slurry feeding device K(6) includes a pair of slurry feeding plates 47. Each of the slurry feeding plates 47 includes an inner ring 44. The pair of the filter cloths 10-1 and 10-2 are, respectively, attached to the pair of the inner rings 44 by the use of flush bolts 45 so as to interpose the pair of the inner rings 44 therebetween such that threaded portions of the flush bolts 45 projecting out of the pair of the inner rings 44 confront each other. Then, nuts 46 are fastened to the threaded portions of the flush bolts 45 projecting out of the pair of the inner rings 44. Accordingly, when the adjacent filter plates 8 are clamped to each other, the nuts 46 projecting out of the pair of the inner rings 44 and confronting each other are brought into contact with each other, whereby a slurry feed passage 48 is defined between the pair of the inner rings 44.

Figure 20:
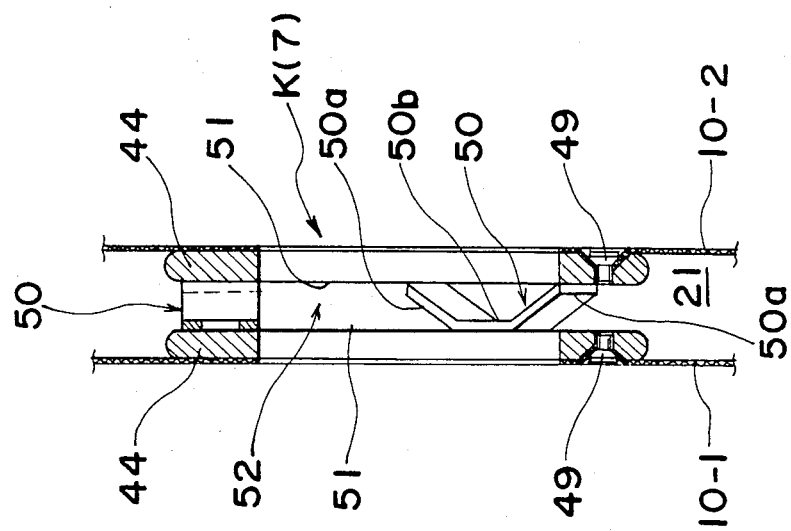
FIGS. 19 and 20 are views similar to FIGS. 3 and 5, respectively, particularly showing a seventh modification thereof.
Figure 19:
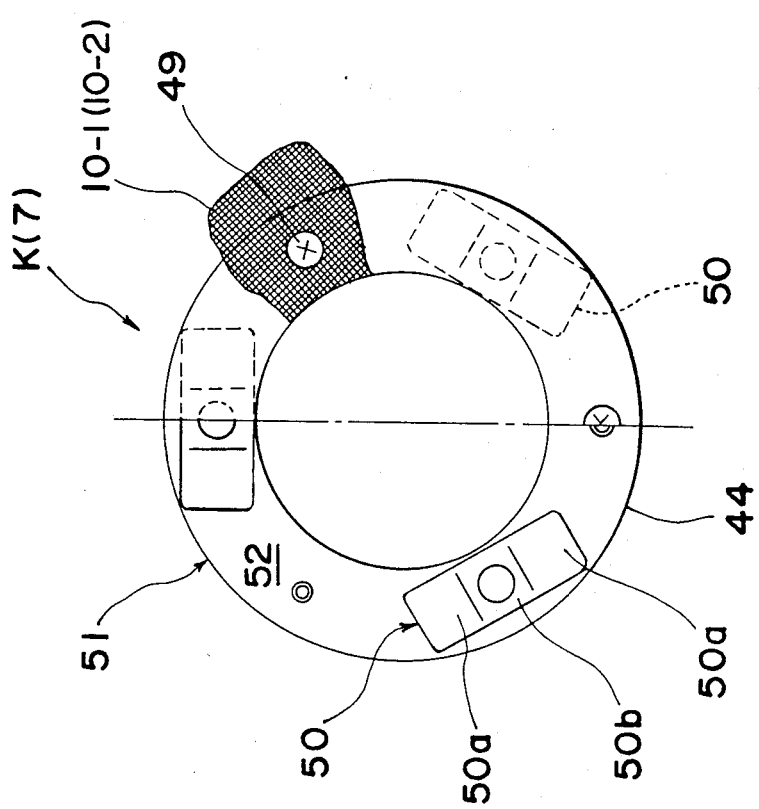

Referring to FIGS. 19 and 20, there is shown a slurry feeding device K(7) which is a seventh modification of the slurry feeding device K. The seventh modified slurry feeding device K(7) includes a pair of slurry feeding plates 51. Each of the slurry feeding plates 51 includes the inner ring 44. The pair of the filter cloths 10-1 and 10-2 are, respectively, attached to the pair of the inner rings 44 by the sue of a plurality of flush bolts 49 so as to interpose the pair of the inner rings 44 therebetween. Furthermore, three spring plates 50 each having a pair of raised end portions 50a and a flat central portion 50b are provided between the pair of the inner rings 44 such that the central portions 50a of the spring plates 50 are welded to one of the pair of the inner rings 44. with the raised end portions 50b of the spring plates 50 confronting the other one of the pair of the inner rings 44. Accordingly, when the adjacent filter plates 8 are clamped to each other, a slurry feed passage 52 is defined between the pair of the inner rings 44 through contact of the raised end portions 50b of the spring plates 50 with the other one of the pair of the inner rings 44.

Referring to FIGS. 21 and 22, there is shown a slurry feeding device K(8) which is an eighth modification of the slurry feeding device K. The eighth modified slurry feeding device K(8) includes a pair of slurry feeding plates 58. Each of the slurry feeding plates 58 includes an inner ring 55 formed with a plurality of holes 55a and a retainer ring 56 formed with a plurality of bosses 56a engageable with the holes 55a, respectively. Each of the bosses 56a is formed with a threaded hole 56b extending therethrough. Thus, after the bosses 56a of the retainer ring 56 are fitted into the holes 55a of the inner ring 55, the inner ring 55 is secured to the retainer ring 56 by screwing hexagon head bolts 57 from the inner ring 55 into the threaded holes 56b of the retainer ring 56 so as to interpose each of the filter cloths 10-1 and 10-2 therebetween such that hexagon heads 57a of the hexagon head bolts 57 projecting out of the pair of the inner rings 55 confront each other. Accordingly, when the adjacent filter plates 8 are clamped to each other, the hexagon heads 57a of the hexagon head bolts 57 projecting out of the pair of the inner rings 55 and confronting each other are brought into contact with each other, whereby a slurry feed passage 59 is defined between the pair of the inner rings 55.

Referring to FIGS. 23 and 24, there is shown a slurry feeding device K(9) which is a ninth modification of the slurry feeding device (K). The ninth modified slurry feeding device K(9) includes a pair of slurry feeding plates 62. Each of the slurry feeding plates 62 includes an inner ring 60 and a retainer ring 61. The inner ring 60 has a cylindrical portion 60b formed with external threads 60a and a flange portion 60c integrally formed with the cylindrical portion 60b, while the retainer ring 61 is formed with internal threads 61a engageable with the external threads 60a of the inner ring 60 and a plurality of tool holes 61b for receiving pin members of a clamping tool therein. Furthermore, each of the inner rings 60 has two grooves 63 formed on one face of the flange portion 60c remote from each of the adjacent filter plates 8 and extending at right angles to each other. Thus, after the cylindrical portion 60b of the inner ring 60 is inserted into each of the slurry holes 10a of the pair of the filter cloths 10-1 and 10-2 and then, the external threads 60a of the inner ring 60 are screwed into the internal threads 61a of the retainer ring 61 by using the clamping tool through fitting of the pin members of the clamping tool into the tool holes 61b of the retainer ring 61, the inner ring 60 and the retainer ring 61 are secured to each other so as to interpose each of the pair of filter cloths 10-1 and 10-2 therebetween such that ungrooved portions 64 of the pair of the inner rings 60 confront each other. Accordingly, when the adjacent filter plates 8 are clamped to each other, the ungrooved portions 64 of the pair of the inner rings 60 are brought into contact with each other, whereby a slurry feed passage 65 is defined between the pair of the inner rings 60 by the grooves 63 of the pair of the inner rings 60.

Figure 25:
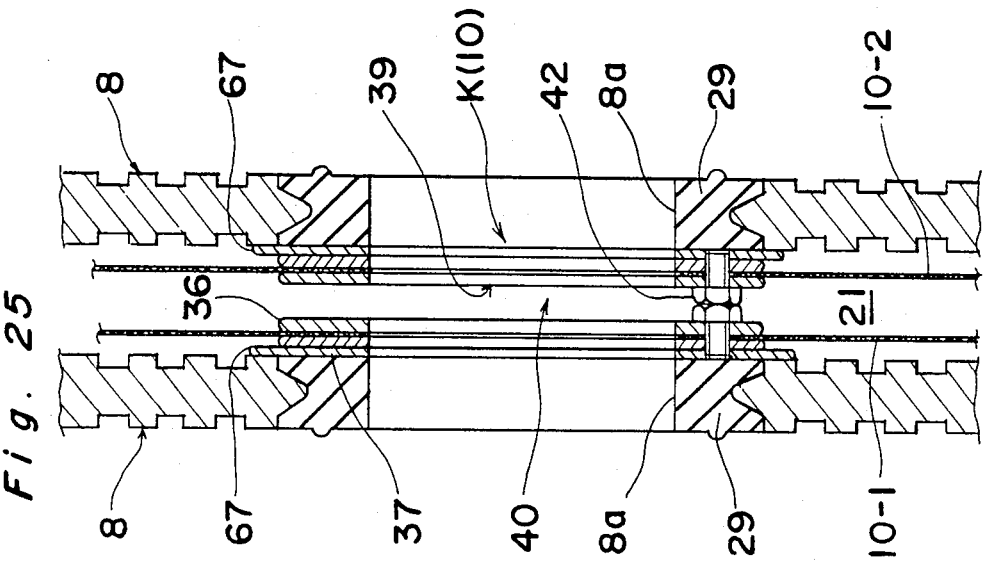
FIG. 25 is a view similar to FIG. 5, particularly showing a tenth modification thereof.

Referring now to FIG. 25, there is shown a slurry feeding device K(10) which is a tenth modification of the slurry feeding device K. In the tenth modified slurry feeding device K(10), the fourth modified slurry feeding device K(4) is so modified that a sealing ring 67 made of, for example, rubber is additionally provided between each of the pair of the outer rings 37 and each of the pair of the adjacent filter plates 8. By the above described sealing arrangement of the tenth modified slurry feeding device K(10), even if the slurry feeding plate 39 is slightly inaccurately positioned with respect to the slurry feed opening 8a defined by the packing 29 of each of the pair of adjacent filter plates 8, a clearance between the outer ring 37 and the packing 29 is positively sealed by the sealing ring 67, whereby the slurry is prevented from leaking out of the slurry feed opening 8a towards one face of each of the pair of the filter cloths 10-1 and 10-2 adjacent to the packing 29. Meanwhile, although it is desirable that the sealing ring 67 is formed larger, in outside diameter, than the outer ring 37 in consideration of the above described inaccurate positioning of the slurry feeding plate 39 with respect to the slurry feed opening 8a of each of the pair of the adjacent filter plates 8, it can be also so arranged that the outer ring 37 itself is formed large properly so as to be equal, in outside diameter, to the sealing ring 67.

Figure 26:
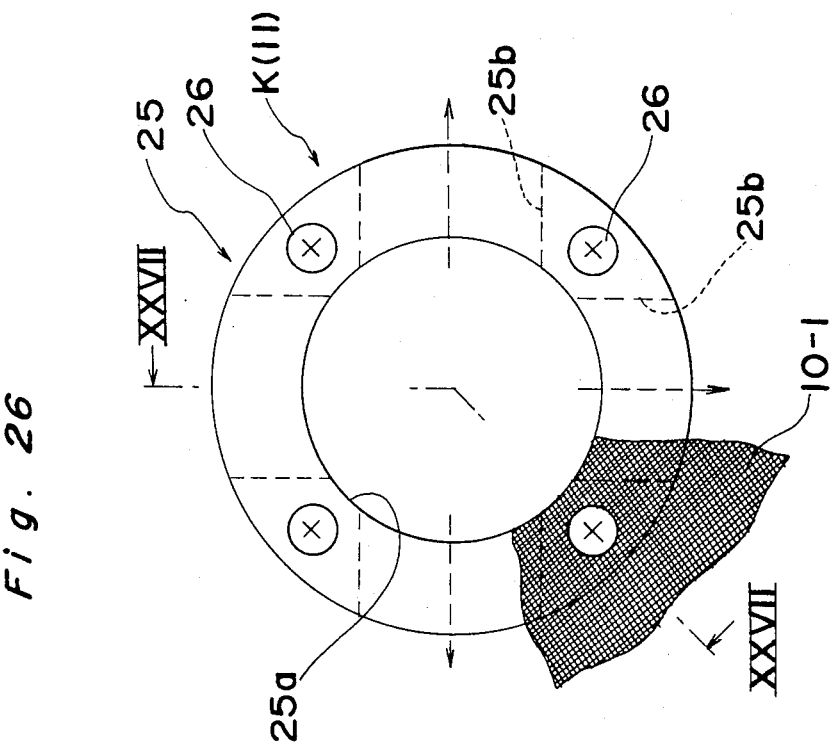

Referring to FIGS. 26 to 28, there is shown a slurry feeding device K(11) which is an eleventh modification of the slurry feeding device K. It is to be noted that FIG. 27 is a cross-sectional view taken along the line XXVII—XXVII in FIG. 26. The eleventh modified slurry feeding device K(11) includes a single slurry feeding plate 25 secured to one of the pair of the filter cloths 10-1 and 10-2 by the use of the flush bolts 26. The slurry feeding plate 25 has a through-hole 25a extending axially in communication with the slurry holes 10a of the pair of the filter cloths 10-1 and 10-2 and two through-openings 25b extending radially at right angles to each other in communication with the through-hole 25a such that the through-openings 25b act as a slurry feed passage. When the adjacent filter plates 8 are clamped to each other as shown in FIG. 28, the slurry feeding plate 25 is clamped between the adjacent filter plates 8 through the pair of the filter cloths 10-1 and 10-2, whereby the through-openings 25b act as the slurry feed passage.

Figure 29:
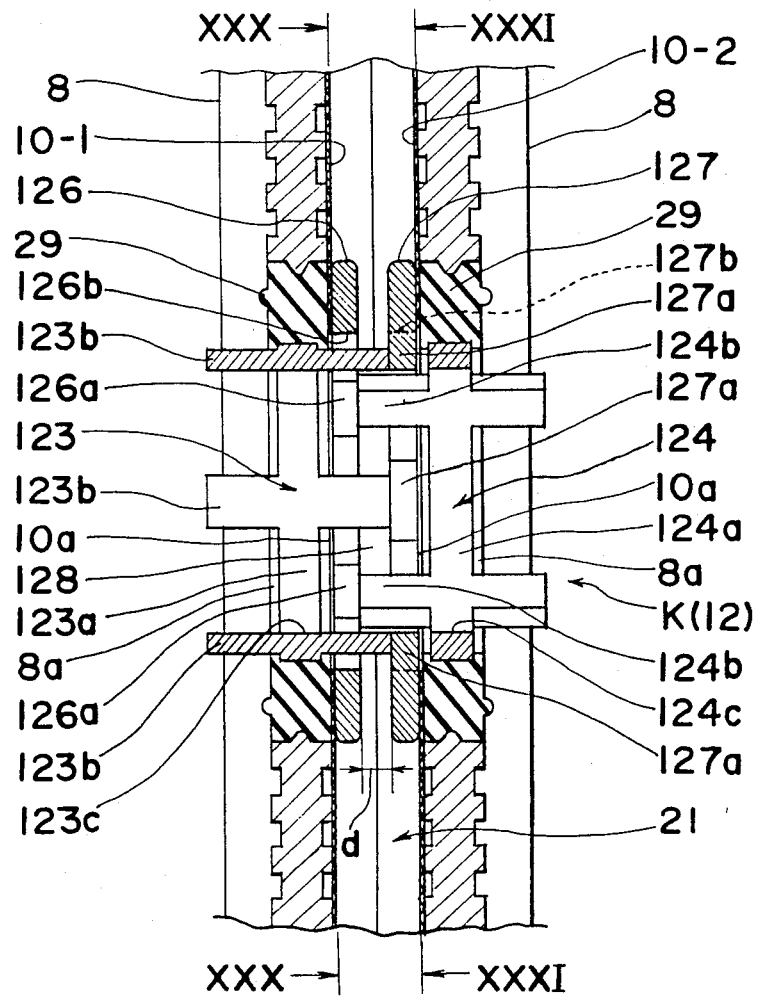
FIG. 29 is a view similar to FIG. 5, particularly showing a twelfth modification thereof.
Figure 30:
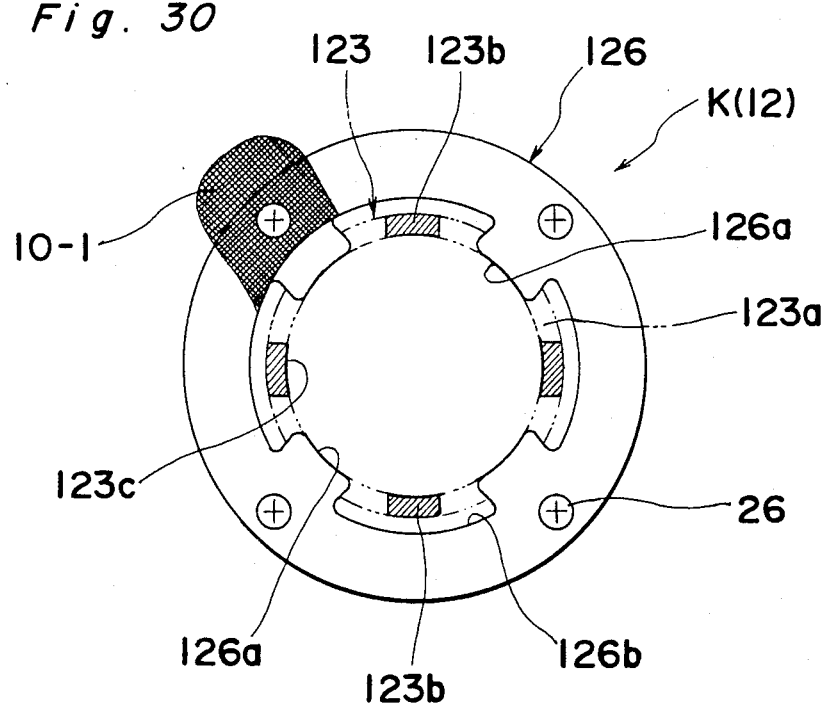
FIG. 30 is a cross-sectional view taken along the line XXX—XXX in FIG. 29.
Figure 31:
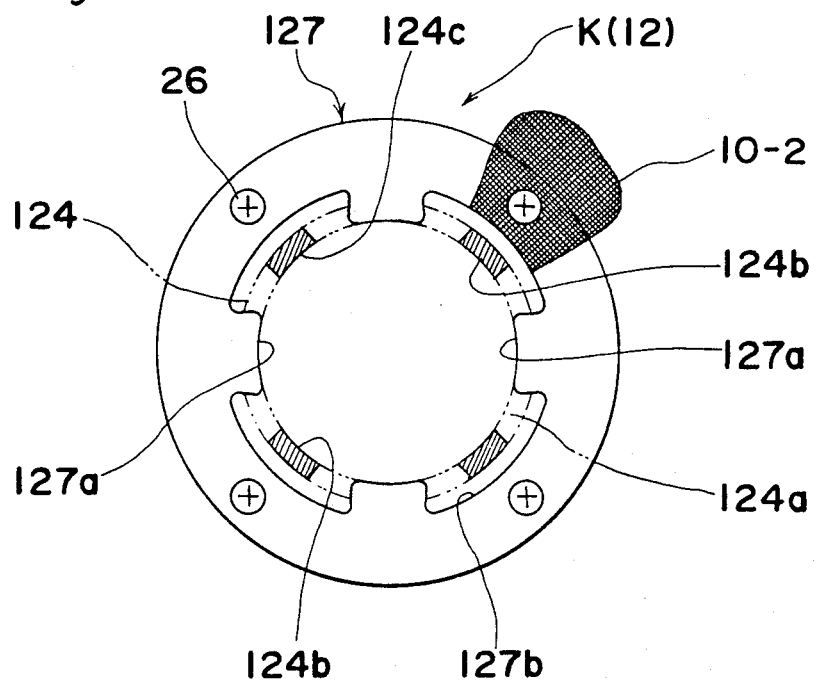
FIG. 31 is a cross-sectional view taken along the line XXXI—XXXI in FIG. 29.

Referring to FIGS. 29 to 31, there is shown a slurry feeding device K(12) which is a twelfth modification of the slurry feeding device K. The twelfth modified slurry feeding device K(12) includes a first thrust member 123, a second thrust member 124, a first slurry feeding plate 126 and a second slurry feeding plate 127. The first thrust member 123 has an annular portion 123a detachably fitted into the slurry feed opening 8a of one of the adjacent filter plates 8, a plurality of pillared portions 123b extending axially from the annular portion 123a in opposite directions, and a through-hole 123c defined by the annular portion 123a. The pillared portions 123b are formed along a circumferential direction of the annular portion 123a at an interval of, for example, 90°. The second thrust member 124 is substantially equal, in structure, to the first thrust member 123 and is formed with an annular portion 124a, a plurality of pillared portions 124b and a through-hole 124c such that the annular portion 124a is detachably fitted into the slurry feed opening 8a of the other one of the adjacent filter plates 8. Meanwhile, the first and second slurry feeding plates 126 and 127 are, respectively, attached to the pair of the filter cloths 10-1 and 10-2 by the flush bolts 26 such that the pair of the filter cloths 10-1 and 10-2 are, respectively, disposed between the first slurry feeding plate 126 and the one of the adjacent filter plates 8 and between the second slurry feeding plate 127 and the other one of the adjacent filter plates 8. The first slurry feeding plate 126 is formed with a through-hole 126b having an inside diameter larger than an outside diameter of the pillared portions 123b of the first thrust member 123 and a plurality of stopper portions 126a extending radially inwardly from the through-hole 126b. Likewise, the second slurry feeding plate 127 is formed with a through-hole 127b having an inside diameter larger than an outside diameter of the pillared portions 124b of the second thrust member 124 and a plurality of stopper portions 127a extending radially inwardly from the through-hole 127b. Since the first and second thrust members 123 and 124 are, respectively, fitted into the slurry feed openings 8a of the adjacent filter plates 8 such that the pillared portions 123b are brought out of alignment with the pillared portions 124b, the pillared portions 123b and 124b are, respectively, inserted between adjacent ones of the pillared portions 124b and between adjacent ones of the pillared portions 123b when the adjacent filter plates 8 are clamped to each other. Accordingly, when the adjacent filter plates 8 are clamped to each other as shown in FIG. 29, the pillared portions 123b of the first thrust member 123 and the pillared portions 124b of the second thrust member 124 are, respectively, brought into contact with the stopper portions 127a of the second slurry feeding plate 127 and the stopper portions 126a of the first slurry feeding plate 126 such that a predetermined clearance d is formed between the first and second slurry feeding plates 126 and 127, whereby a slurry feed passage 128 is defined between the first and second slurry feeding plates 126 and 127 by the clearance d.

In the above described arrangement of the twelfth modified slurry feeding device K(12), even if a thickness of the filter plates 8 or a clamping stroke of the filter plates 8 is changed, the first and second slurry feeding plates 126 and 127 are not required to be replaced, but only the first and second thrust members 123 and 124 are required to be replaced.

In the above described slurry feeding devices K and K(1) to K(12), it can be so modified that the slurry feed opening 8a is provided at a location other than the central portion of each of the filter plates 8, for example, at a peripheral portion thereof and a plurality of the slurry feed openings 8a are provided on each of the filter plates 8. Furthermore, it can be so modified that a packing made of rubber and having flange portions formed on opposite sides thereof is fitted into a slurry feed portion of each of the filter plates.

Hereinbelow, the filter cloth retaining device M will be described with reference to FIGS. 32 and 33. The filter cloth retaining device M includes a pair of rods 12 for securing the lower ends of each pair of the filter cloths 10-1 and 10-2 thereto, respectively, a bracket 79 formed with a pair of slots 80 extending downwardly and a clasp 82 formed with a pair of elongated openings 81 extending in parallel with the slots 80. The bracket 79 secured to a bottom face of each of the pair of filter plates 8 further has two threaded holes 83 (not shown) formed at a lower portion thereof and the slots 80 have open lower ends 80a formed at opposite sides of the bracket 79. After end portions of the pair of the rods 12 are, respectively, inserted into the slots 80 from the open lower ends 80a as shown by the arrows in FIG. 32, the clasp 82 is secured at a proper position of the bracket 79 by screwing two hexagon socket head cap screws 84 into the threaded holes 83 through the elongated openings 81, respectively so as to cover the open lower ends 80a of the slots 80. Thus, the rods 12 can be vibrated in the slots 80 in upward and downward directions of the bracket 79 within a range of an amplitude T. When the clasp 82 is lowered by loosening the hexagon socket head cap screws 84, the rods 12 can be removed from the slots 80, respectively. Meanwhile, the amplitude T can be changed within a length of the elongated openings 81 by adjusting clamping positions of the clasp 82.

Referring now to FIGS. 34(a) and 34(b) and FIGS. 35(a) and 35(b), there is shown a filter cloth retaining device M(1) which is a first modification of the filter cloth retaining device M. The first modified filter cloth retaining device M(1) includes a bracket 86 and a clasp 91. The bracket 86 has a pair of side forks 86a extending downwardly at opposite sides thereof and a central fork 87 extending downwardly between the side forks 86a such that a pair of slots 93 are defined between the central fork 87 and one of the side forks 86a and between the central fork 87 and the other one of the side forks 86a, respectively. The bracket 86 further has a guide protrusion 88 formed at a lower portion of the central fork 87 and a threaded hole is formed on the guide protrusion 88. Meanwhile, the clasp 91 has a hanger 90 which is formed with an elongated opening 89 engageable with the guide protrusion 88 of the bracket 86 such that the clasp 91 is secured to the bracket 86 through fitting of the guide protrusion 88 into the elongated opening 89 by screwing a setscrew 92 into the threaded hole of the guide protrusion 88. In the above described arrangement of the first modified filter cloth retaining device M(1), after the pair of the rods 12 have been inserted into the slots 93 with the clasp 91 being lowered as shown in FIGS. 34(a) and 35(a), the clasp 91 is pushed upwardly and then, is secured to the bracket 86 by the use of the set screw 92 as shown in FIGS. 34(b) and 35(b), whereby the clasp 91 can be secured to the bracket 86 or moved with respect to the bracket 86 with much ease.

Referring to FIGS. 36 and 37, there are shown filter cloth retaining devices M(2) and M(3) which are second and third modifications of the filter cloth retaining device M, respectively. In the second and third modified filter cloth retaining devices M(2) and M(3), clasps 94 and 95 are, respectively, pivotally supported at the lower portion of the bracket 79 so as to be pivoted about a setting bolt thereof. Thus, when the clasps 94 and 95 are pivoted alternately, the open lower ends 80a of the pair of the slots 80 are alternately exposed, whereby the pair of the rods 12 can be alternately inserted into the pair of the slots 80.

Referring to FIGS. 38(a) and 38(b), there is shown a filter cloth retaining device M(4) which is a fourth modification of the filter cloth retaining device M. The fourth modified filter cloth retaining device M(4) includes a clasp 96 formed with a T-shaped slot 97 and a setscrew 98 having an engageable portion 98a of a rectangular cross section. The T-shaped slot 97 includes a horizontal slot portion 97a and a vertical slot portion 97b extending upwardly from the horizontal slot portion 97a so as to receive the engageable portion 98a therein. In the above described arrangement of the fourth modified filter cloth retaining device K(4), the clasp 96 can be secured with the engageable portion 98a being fitted into the vertical slot portion 97b as shown in the solid lines in FIG. 38(a). Meanwhile, in order to unclamp the clasp 96, the clasp 96 is lifted upwardly such that the engageable portion 98a is disengaged from the vertical slot portion 97b into the horizontal slot portion 97a, so that the clasp 96 can be moved in sidewise directions within a length of the horizontal slot portion 97a such that the open lower ends 80a of the pair of the slots 80 are exposed alternately. Furthermore, it is desirable that the clasps 96 are provided so as to be spaced away from each other in an axial direction of the rods 12 such that the clasps 96 are held out of contact with each other between the adjacent filter plates 8.

Referring to FIG. 39, there is shown a filter cloth retaining device M(5) which is a fifth modification of the filter cloth retaining device M. The fifth modified filter cloth retaining device M(5) includes a bracket 100, a pair of pins 101, a pair of pins 102 and a pair of clasps 103 of a latch type. The bracket 100 has a pair of cutout portions formed at opposite sides thereof and thus, includes an upper portion 100b, a lower portion 100c and a central throat portion 100a connecting the upper portion 100b and the lower portion 100c. Meanwhile, each of the clasps 103 has a central throat portion 103a, an elongated opening 104 formed at a lower portion thereof and engageable with each of the pins 102 and a hook 105 formed at an upper portion thereof and engageable with each of the pins 101. The pair of the pins 101 and the pair of the pins 102 are, respectively, driven into the upper portion 100b and the lower portion 100c of the bracket 100. As shown in a left-hand portion of FIG. 39, when one of the clasps 103 is engaged with one of the pins 101, a slot 106 which receives one of the rods 12 such that the one of the rods 12 can be vibrated therein is formed between the central throat portion 103a of the one of the clasps 103 and the central throat portion 100a of the bracket 100. In the above described arrangement of the fifth modified filter cloth retaining device M(5), the rods 12 for retaining the lower portions of each pair of the filter cloths 10-1 and 10-2 can be easily inserted into or removed from the slots 106, respectively, thus resulting in an excellent working efficiency.

Hereinbelow, a filter cloth arrangement S2 according to a second embodiment of the present invention will be described with reference to FIGS. 40 and 41. The filter cloth arrangement S2 includes a filter cloth supporting device L2. The filter cloth supporting device L2 includes a support rod 71 for supporting an upper end of a filter cloth 70 of one-piece construction hanging therefrom, a pair of brackets 73 secured to opposite sides of each of the filter plates 8, respectively, and extending upwardly therefrom, a pair of pins 74 secured to upper portions of the pair of the brackets 73, respectively, and confronting each other, and a pair of coiled springs 75 hanging from the pair of the pins 74, respectively. An opening 72 for receiving the support rod 71 therein is formed at a central portion of the filter cloth 70 by sewing together. Thus, opposite ends of the support rod 71 inserted through the opening 72 of the filter cloth 70 are elastically supported by the pair of the coiled springs 75, respectively, such that two halves of the filter cloth 70 cover opposite filtration areas of each of the filter plates 8. Since other constructions of the filter cloth arrangement S2 are similar to those of the filter cloth arrangement S1, detailed description thereof is abbreviated for the sake of brevity.

Referring now to FIGS. 42 and 43, there are shown filter cloth arrangements S3 and S4 according to third and fourth embodiments of the present invention, respectively. It will be readily seen that the filter cloth arrangments S3 and S4 correspond to the filter cloth arrangements S1 and S2, respectively. The filter cloth arrangements S3 and S4 include filter cloth supporting devices L3 and L4, respectively. In the above described filter cloth supporting devices L1 and L2, it is so arranged that the pair of rods 12 for retaining the lower ends of each pair of the filter cloths 10-1 and 10-2 (70) are adjustably set so as to determine the amplitude of the rods 12 and position the filter cloths 10-1 and 10-2 (70). On the other hand, in the filter cloth supporting devices L3 and L4, an amplitude regulating device 220 shown in FIG. 44 is coupled to the support rod 11 (71) for supporting the upper ends of each pair of the filter cloths 10-1 and 10-2 (70) such that upper and lower limits of vibration of the support rod 11 (71) can be adjustably set.

Namely, as shown in FIG. 44, the amplitude regulating device 220 includes an outer sleeve 221, an inner sleeve 222 provided in the outer sleeve 221, a coiled spring 223 wound around the inner sleeve 222, a bottom sleeve 224 in threaded engagement with a lower outer peripheral surface of the outer sleeve 221, a bracket 225 mounted on an outer surface of a top wall of the outer sleeve 221, a nut 226 engageable with the hinge pin 14 (pin 74), a coupling bolt 227, a nut 228 engageable with the coupling bolt 227 and a fixture 229 attached to a lower end of the coupling bolt 227. The outer sleeve 221 and the inner sleeve 222 are movable relative to each other and the inner sleeve 222 has an upper flange 222a and a threaded hole 222b formed at a lower portion thereof. Meanwhile, the bottom sleeve 224 has a bottom wall 224a. Thus, upper and lower ends of the coiled spring 223 are, respectively, supported by the upper flange 222a of the inner sleeve 222 and the bottom wall 224a of the bottom sleeve 224. The bracket 225 is secured to the hinge pin 14 (pin 74) by the use of the nut 226. Furthermore, the coupling bolt 227 is screwed into the threaded hole 222b of the inner sleeve 222 and is locked in position by the nut 228 after the coupling both 227 has been adjusted in height. The fixture 229 secured to the lower end of the coupling bolt 227 is arranged to support each of the opposite ends of the support rod 11 (71). In the above described arrangements of the filter cloth arrangements S3 and S4, the upper limit of vibration of the support coil rod 11 (71) is determined through contact of the upper flange 222a of the inner sleeve 222 with an inner surface of the top wall of the outer sleeve 221, while the lower limit of vibration of the support rod 11 (71) is determined by a maximum compressible length of the coiled spring 223 and a position of the coupling bolt 227.

In the filter cloth arrangement S3 (FIG. 42), since the pair of the filter cloths 10-1 and 10-2 are strained in a substantially V-shaped configuration, each of the pair of the rods 12 for retaining the lower ends of each pair of the filter cloths 10-1 and 10-2 is supported by a bracket 231 formed with a pair of elongated openings 230.

Meanwhile, in the filter cloth arrangement S4 (FIG. 43), it can be so arranged that the pair of the rods 12 are set free as shown.

As is clear from the foregoing description, in accordance with the present invention, since each of the filter cloths for use in the fixed filter cloth type filter presses can be vibrated as a whole when the filter plates are retracted away from each other, filter cakes can be smoothly scraped from the filter cloths, thus resulting in a stable filtering capacity of the filter presses of this kind.

Furthermore, in accordance with the present invention, even if a thickness of the filter plates or a clamping stroke of the filter plates is changed, the slurry feeding plates are not required to be replaced but only the thrust members are required to be replaced.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as included therein.

What is claimed is:

1. A filter cloth arrangement for use in a fixed filter cloth type filter press including at least one pair of first and second filter plates formed with first and second slurry feed openings, respectively, and a pair of first and second filter cloths interposed between said first and second filter plates, said first and second filter cloths being, respectively, formed with first and second slurry holes in communication with said first and second slurry feed openings and defining a filter chamber therebetween when said first and second filter plates are clamped to each other, said filter cloth arrangement comprising:

a support member for supporting upper ends of said first and second filter cloths;

an elastic member for vibratingly supporting said support member;

a fixing member for fixing lower ends of said first and second filter cloths to lower portions of said first and second filter plates, respectively; and a first slurry feeding plate which is attached to said first filter cloth so as to be disposed between said first and second filter cloths such that said first filter cloth is vibrated together with said first slurry feeding plate when said first and second filter plates are retracted away from each other;

said first slurry feeding plate, when said first and second filter plates are clamped to each other, defining a slurry feed passage for introducing, in communication with said first and second slurry holes, into said filter chamber, slurry to be filtered such that the slurry is fed from either one of said first and second slurry feed openings into said filter chamber through corresponding either one of said first and second slurry holes and said slurry feed passage.

2. A filter cloth arrangement as claimed in claim 1, wherein said first slurry feeding plate is formed with a through-opening extending in a radial direction thereof such that said through-opening defines said slurry feed passage.

3. A filter cloth arrangement as claimed in claim 1, further including a second slurry feeding plate, said second slurry feeding plate being attached to said second filter cloth so as to be disposed between said first and second filter cloths such that said second filter cloth is vibrated together with said second slurry feeding plate when said first and second filter plates are retracted away from each other, with said first and second slurry feeding plates confronting each other, said first and second slurry feeding plates, when said first and second filter plates are clamped to each other, being spaced away from each other in an axial direction of said first and second slurry feed openings so as to form a clearance therebetween such that said clearance defines said slurry feed passage.

4. A filter cloth arrangement as claimed in claim 3, wherein at least one said first and second slurry feeding plates is formed with a projections, said projection, when said first and second filter plates are clamped to each other, being brought into contact with the other one of said first and second slurry feeding plates so as to form said clearance between said first and second slurry feeding plates.

5. A filter cloth arrangement as claimed in claim 3, further including a first thrust member fitted into said first slurry feed opening and a second thrust member fitted into said second slurry feed opening, said first and second thrust members when said first and second filter plates are clamped to each other, being, respectively, brought into contact with said second slurry feeding plate and said first slurry feeding plate so as to form said clearance between said first and second slurry feeding plates.

6. A filter cloth arrangement as claimed in claim 1, wherein said fixing member includes a pair of first and second rods for securing the lower ends of said first and second filter cloths thereto, respectively, and a pair of first and second fixtures for supporting end portions of said first and second rods, respectively, said first and second fixtures being, respectively, secured to lower ends of said first and second filter plates so as to allow said first and second rods to vibrate in upward and downward directions of said first and second filter plates.

7. A filter cloth arrangement as claimed in claim 1, wherein said fixing member includes a pair of first and second rods for securing the lower ends of said first and second filter cloths thereto, respectively, which are set free from said first and second filter plates.

8. A filter cloth arrangement as claimed in claim 2, wherein said fixing member includes a pair of first and second rods for securing the lower ends of said first and second filter cloths thereto, respectively, and a pair of first and second fixtures for supporting end portions of said first and second rods, respectively, said first and second fixtures being, respectively, secured to lower ends of said first and second filter plates so as to allow said first and second rods to vibrate in upward and downward directions of said first and second filter plates.

9. A filter cloth arrangement as claimed in claim 4, wherein said fixing member includes a pair of first and second rods for securing the lower ends of said first and second filter cloths thereto, respectively, and a pair of first and second fixtures for supporting end portions of said first and second rods, respectively, said first and second fixtures being, respectively, secured to lower ends of said first and second filter plates so as to allow said first and second rods to vibrate in upward and downward directions of said first and second filter plates.

10. A filter cloth arrangement as claimed in claim 5, wherein said fixing member includes a pair of first and second rods for securing the lower ends of said first and second filter cloths thereto, respectively, and a pair of first and second fixtures for supporting end portions of said first and second rods, respectively, said first and second fixtures being, respectively, secured to lower ends of said first and second filter plates so as to allow said first and second rods to vibrate in upward and downward directions of said first and second filter plates.

* * * * *